(12) United States Patent
Zhang et al.

(10) Patent No.: US 12,302,280 B2
(45) Date of Patent: May 13, 2025

(54) BARRIER TYPE DETECTION USING TIME-OF-FLIGHT AND RECEIVE SIGNAL STRENGTH INDICATION

(71) Applicant: QUALCOMM Incorporated, San Diego, CA (US)

(72) Inventors: Xiaoxin Zhang, Sunnyvale, CA (US); Edwin Chongwoo Park, San Diego, CA (US); Bala Ramasamy, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/731,850

(22) Filed: Apr. 28, 2022

(65) Prior Publication Data

US 2023/0354261 A1 Nov. 2, 2023

(51) Int. Cl.
| | | |
|---|---|---|
| H04W 12/63 | (2021.01) | |
| H04L 43/0864 | (2022.01) | |
| H04W 12/50 | (2021.01) | |
| H04W 12/79 | (2021.01) | |
| H04W 64/00 | (2009.01) | |

(52) U.S. Cl.
CPC ....... *H04W 64/006* (2013.01); *H04L 43/0864* (2013.01); *H04W 12/50* (2021.01); *H04W 12/63* (2021.01); *H04W 12/79* (2021.01)

(58) Field of Classification Search
CPC ....... H04W 4/40; H04W 12/50; H04W 12/63; H04W 12/79; H04W 64/006; H04W 72/25; H04W 92/00
See application file for complete search history.

(56) References Cited

U.S. PATENT DOCUMENTS

| | | | |
|---|---|---|---|
| 8,364,164 B2 * | 1/2013 | Phatak | G01S 5/02521 |
| | | | 379/37 |
| 11,385,058 B2 * | 7/2022 | Prabhakar | G08G 1/165 |
| 11,727,224 B1 * | 8/2023 | Maricic | G06Q 20/18 |
| | | | 235/375 |
| 11,842,528 B2 * | 12/2023 | Wheeler | G01C 21/3867 |
| 2005/0220306 A1 * | 10/2005 | Westhoff | H04L 9/008 |
| | | | 380/270 |

(Continued)

FOREIGN PATENT DOCUMENTS

| | | |
|---|---|---|
| DE | 102008050820 A1 | 4/2009 |
| WO | 2022081624 A1 | 4/2022 |

OTHER PUBLICATIONS

International Search Report and Written Opinion—PCT/US2023/063034—ISA/EPO—Aug. 14, 2023.

(Continued)

*Primary Examiner* — Jean A Gelin
(74) *Attorney, Agent, or Firm* — Thien T. Nguyen

(57) ABSTRACT

Techniques are provided for utilizing wireless devices to detect and classify barriers between devices. An example method performed by a user equipment for authorizing a device-to-device request includes receiving a request from a wireless node, determining a first range measurement to the wireless node using a first positioning technique, determining a second range measurement to the wireless node using a second positioning technique that is different from the first positioning technique, and allowing or denying the request based on the first range measurement and the second range measurement.

30 Claims, 25 Drawing Sheets

(56) References Cited

U.S. PATENT DOCUMENTS

| | | | | |
|---|---|---|---|---|
| 2008/0157957 | A1* | 7/2008 | Pitchers | G01S 5/02 340/539.1 |
| 2012/0087212 | A1* | 4/2012 | Vartanian | G01S 5/012 367/118 |
| 2013/0109413 | A1 | 5/2013 | Das et al. | |
| 2015/0126213 | A1* | 5/2015 | Fayssal | H04W 4/021 455/456.1 |
| 2016/0094951 | A1* | 3/2016 | Yang | H04W 4/029 455/456.1 |
| 2016/0300252 | A1* | 10/2016 | Frank | G06F 21/6245 |
| 2017/0064667 | A1* | 3/2017 | Mycek | H04W 64/00 |
| 2017/0230801 | A1* | 8/2017 | Amsalem | G01S 5/02 |
| 2018/0066861 | A1 | 3/2018 | Rabb et al. | |
| 2018/0103351 | A1 | 4/2018 | Emmanuel et al. | |
| 2018/0261084 | A1 | 9/2018 | Tsai | |
| 2019/0035244 | A1 | 1/2019 | Garg et al. | |
| 2019/0241154 | A1 | 8/2019 | Elangovan et al. | |
| 2019/0246253 | A1* | 8/2019 | Ryu | H04L 67/04 |
| 2020/0349545 | A1 | 11/2020 | Moshe et al. | |
| 2021/0037498 | A1 | 2/2021 | Soma et al. | |
| 2021/0046655 | A1* | 2/2021 | Deyle | B25J 9/1664 |
| 2021/0215567 | A1 | 7/2021 | Koo et al. | |
| 2021/0271238 | A1* | 9/2021 | Ko | H01Q 1/27 |
| 2021/0327250 | A1* | 10/2021 | Waters | B63B 79/40 |
| 2022/0078575 | A1 | 3/2022 | Raveendran et al. | |
| 2023/0076030 | A1* | 3/2023 | Baek | H04W 64/006 |
| 2023/0091839 | A1* | 3/2023 | Kim | G05D 1/0246 700/245 |
| 2023/0180173 | A1* | 6/2023 | Kazmi | H04L 5/001 455/456.1 |
| 2023/0213647 | A1* | 7/2023 | Rappaport | H01Q 3/26 342/59 |
| 2023/0221397 | A1* | 7/2023 | Baek | H04L 5/005 455/456.1 |
| 2023/0353260 | A1 | 11/2023 | Zhang et al. | |
| 2024/0334228 | A1* | 10/2024 | Keating | H04L 5/0048 |

OTHER PUBLICATIONS

Partial International Search Report—PCT/US2023/063034—ISA/EPO—Jun. 9, 2023.

* cited by examiner

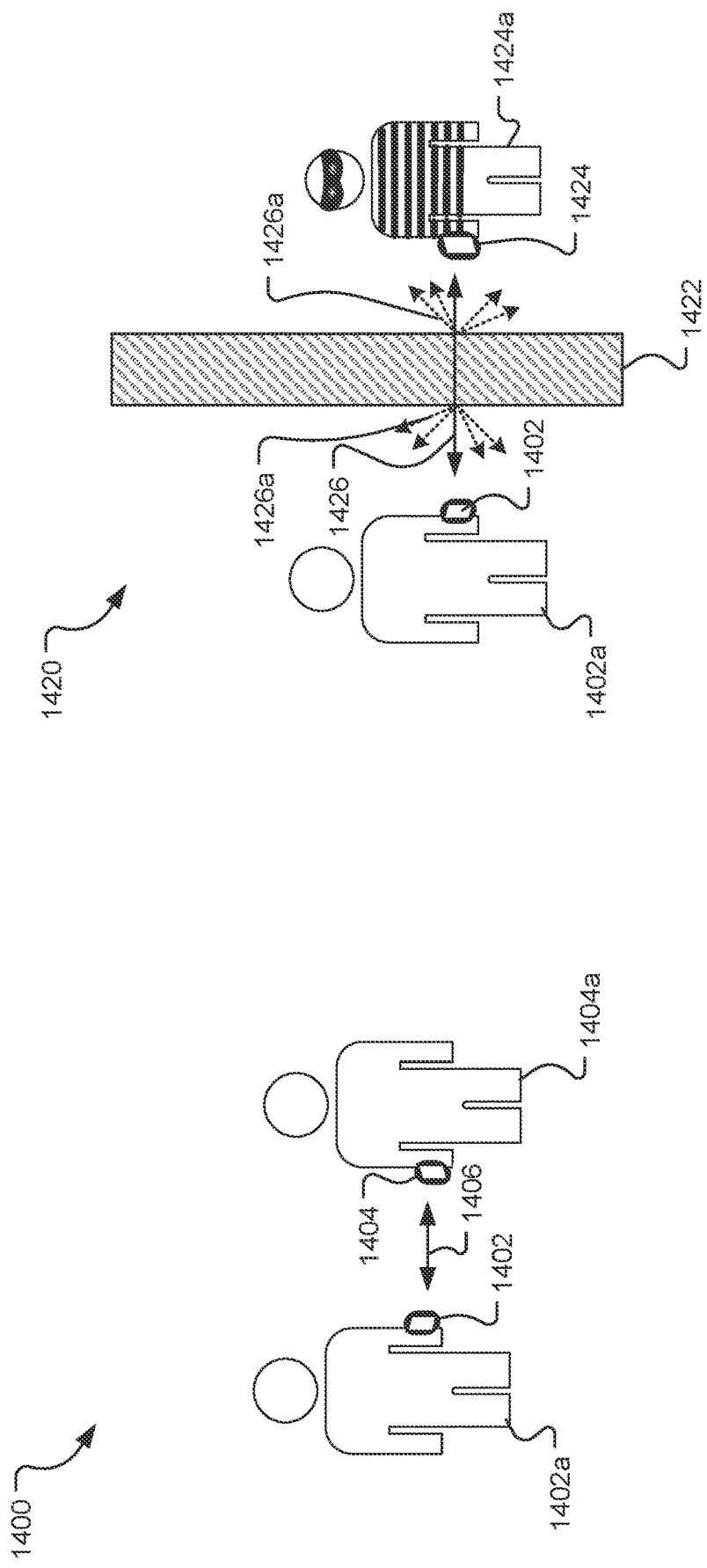

BARRIER TYPE DETECTION USING TIME-OF-FLIGHT AND RECEIVE SIGNAL STRENGTH INDICATION

BACKGROUND

A wireless local area network (WLAN) may be formed by one or more access points (APs) that provide a shared wireless medium for use by a number of client devices. Each AP, which may correspond to a Basic Service Set (BSS), periodically broadcasts beacon frames to enable compatible client devices within wireless range of the AP to establish and maintain a communication link with the WLAN. WLANs that operate in accordance with the IEEE 802.11 family of standards are commonly referred to as Wi-Fi networks, and client devices that communicate with the AP in a Wi-Fi network may be referred to as wireless stations (STAs).

Some wireless devices may be configured to communicate with other wireless devices using radio-frequency signals. For example, a network may include several Internet of Things (IoT) objects and devices configured to wirelessly communicate with each other. Many IoT devices such as smart appliances, smart televisions, and smart thermostats may be configured support wireless protocols such as Wi-Fi, Bluetooth and/or Ultrawideband (UWB). The wireless channels between the wireless devices, and APs, may be used for radio frequency (RF) sensing applications. The devices may listen to and capture the channel parameters on the transmissions between the devices. Variations in signal measurements may be used to detect barriers between the devices. Improved barrier detection techniques may be used in a variety of mapping and user applications.

SUMMARY

An example method for generating mapping information according to the disclosure includes detecting one or more barriers based on measurement information associated with a plurality of radio frequency signals exchanged with one or more wireless nodes, wherein the measurement information include round trip time measurements and received signal strength measurements, determining a location and a material composition for each of the one or more barriers based at least in part on the round trip time measurements and the received signal strength measurements, and generating mapping information based on the location and the material composition of each of the one or more barriers.

Implementations of such a method may include one or more of the following features. Detecting the one or more barriers may be further based on radio frequency sensing information obtained by the one or more wireless nodes. An angle of arrival information associated with the plurality of radio frequency signals exchanged with the one or more wireless nodes may be determined, such that determining the location of each of the one or more barriers is based at least in part on the angle of arrival information. Determining the material composition for each of the one or more barriers may include obtaining material composition information from a data structure based on the round trip time measurements and the received signal strength measurements. The data structure may be maintained on a networked server. The one or more barriers may include a door or a window. A current state of the door or the window may be determined. The one or more wireless nodes may include a user equipment.

An example method performed by a user equipment for authorizing a device-to-device request according to the disclosure includes receiving a request from a wireless node, determining a first range measurement to the wireless node using a first positioning technique, determining a second range measurement to the wireless node using a second positioning technique that is different from the first positioning technique, and allowing or denying the request based on the first range measurement and the second range measurement.

Implementations of such as method may include one or more of the following features. The first positioning technique may be based on a time-of-flight measurement of radio signals exchanged with the wireless node. The first positioning technique may be based on a received signal strength indication of radio signals received from the wireless node. The request may be for a file transfer between the user equipment and the wireless node. The request may be for enabling access to a vehicle. A barrier type based on the first range measurement and the second range measurement may be determined, and allowing or denying the request is based at least in part on the barrier type. At least one of the first positioning technique or the second positioning technique may include obtaining angle of arrival information, and allowing or denying the request is based at least in part on the angle of arrival information. The request may be for providing financial payment information.

Items and/or techniques described herein may provide one or more of the following capabilities, as well as other capabilities not mentioned. Radio frequency (RF) signals exchanged between wireless nodes such as user equipment, access points, and other wireless devices may be configured to detect barriers between the wireless nodes. Time-of-flight techniques, such as round trip timing information, may be used to determine a first range between the wireless nodes. Signal strength measurements, such as received signal strength indicators, may be used to determine a second range between the wireless nodes. Barriers between the wireless nodes may cause attenuation of the RF signals and thus impact the second range measurement. The level of attenuation may be used to determine the orientation and composition of the barriers. The locations and compositions of barriers may be used in mapping applications. The presence of a barrier may be used to allow or deny electronic transactions. The state of barriers, such as being open or closed, may be detected by the RF signals. Barrier type information may be used to determine a context for controllers associated with a physical environment. Other capabilities may be provided and not every implementation according to the disclosure must provide any, let alone all, of the capabilities discussed.

BRIEF DESCRIPTION OF THE DRAWINGS

FIGS. 14A and 14B are diagrams of example use cases for device-to-device data sharing.

DETAILED DESCRIPTION

Techniques are discussed herein for utilizing wireless devices for detecting and classifying barriers between devices. Wireless nodes, such as user equipment (UE), access points (APs), and other mobile devices, may use RF signaling to determine a range between the devices. For example, round trip time (RTT) signals may be used to generate a range estimate between two capable devices by measuring the time it takes for an RF signal to make a round trip between the two devices. The range estimated by such time-of-flight methods is typically more accurate than range estimates obtained via other RF techniques such as a received signal strength indication (RSSI) because RSSI based range estimations may be significantly degraded due to fading, blockage and multipath. A combination of RTT and RSSI measurements, however, may be used to determine if the devices are separated by a barrier such as a concrete wall or a glass window since some barriers will significantly affect RSSI while yielding little to no changes in observed RTT ranges between devices. The values of the RTT and RSSI signals may be used to classify different types of barriers. Barrier type information may be applied to a variety of different use cases such as indoor mapping, proximity detection, contact tracing, network optimization, home comfort and security, and indoor navigation. These techniques and configurations are examples, and other techniques and configurations may be used.

Figure 1:
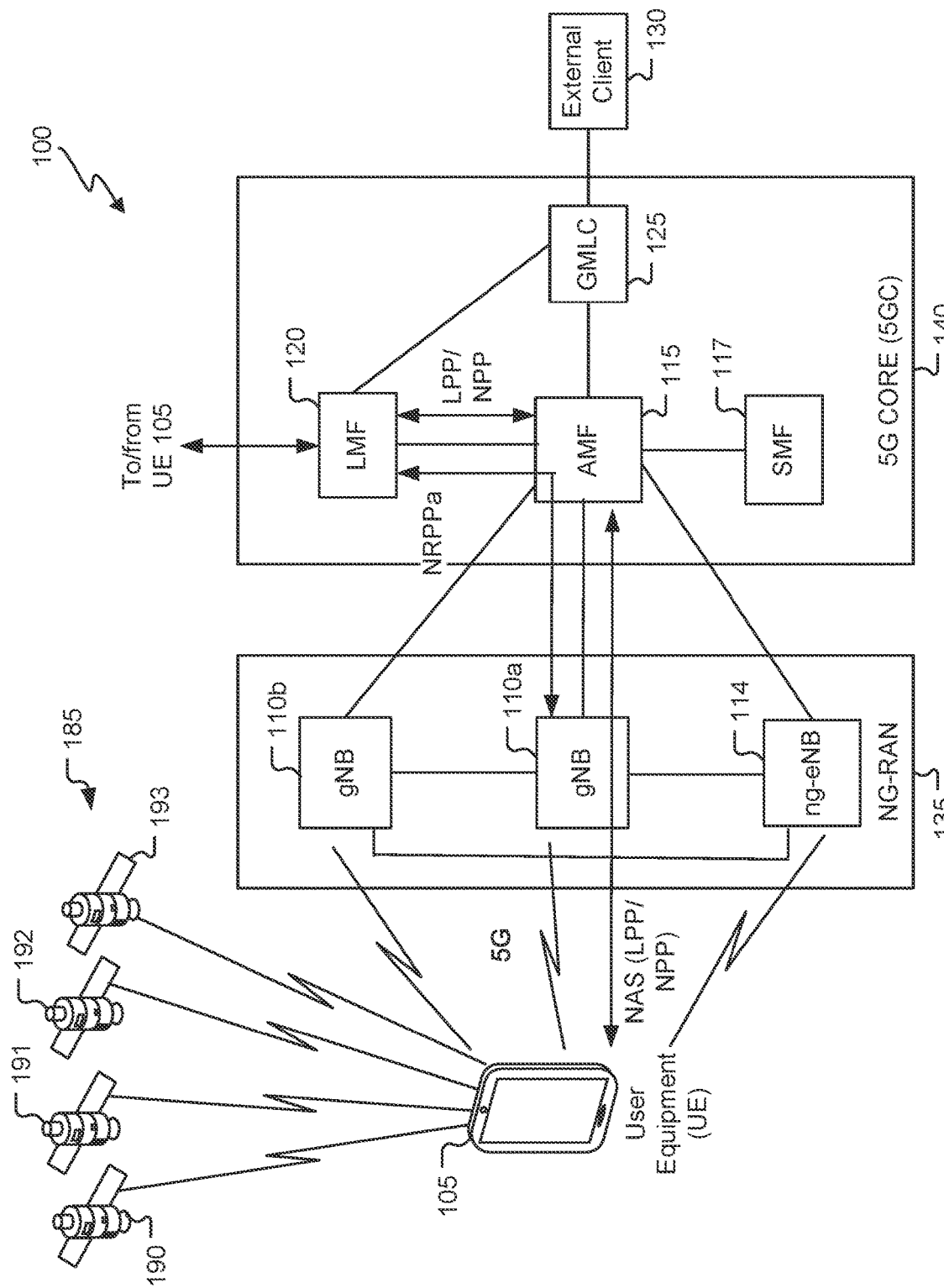
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140.

The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, 5G CV2X Sidelink, 5G ProSe, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs (e.g., gNB 110a, gNB 110b, ng-eNB 114) may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs. WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
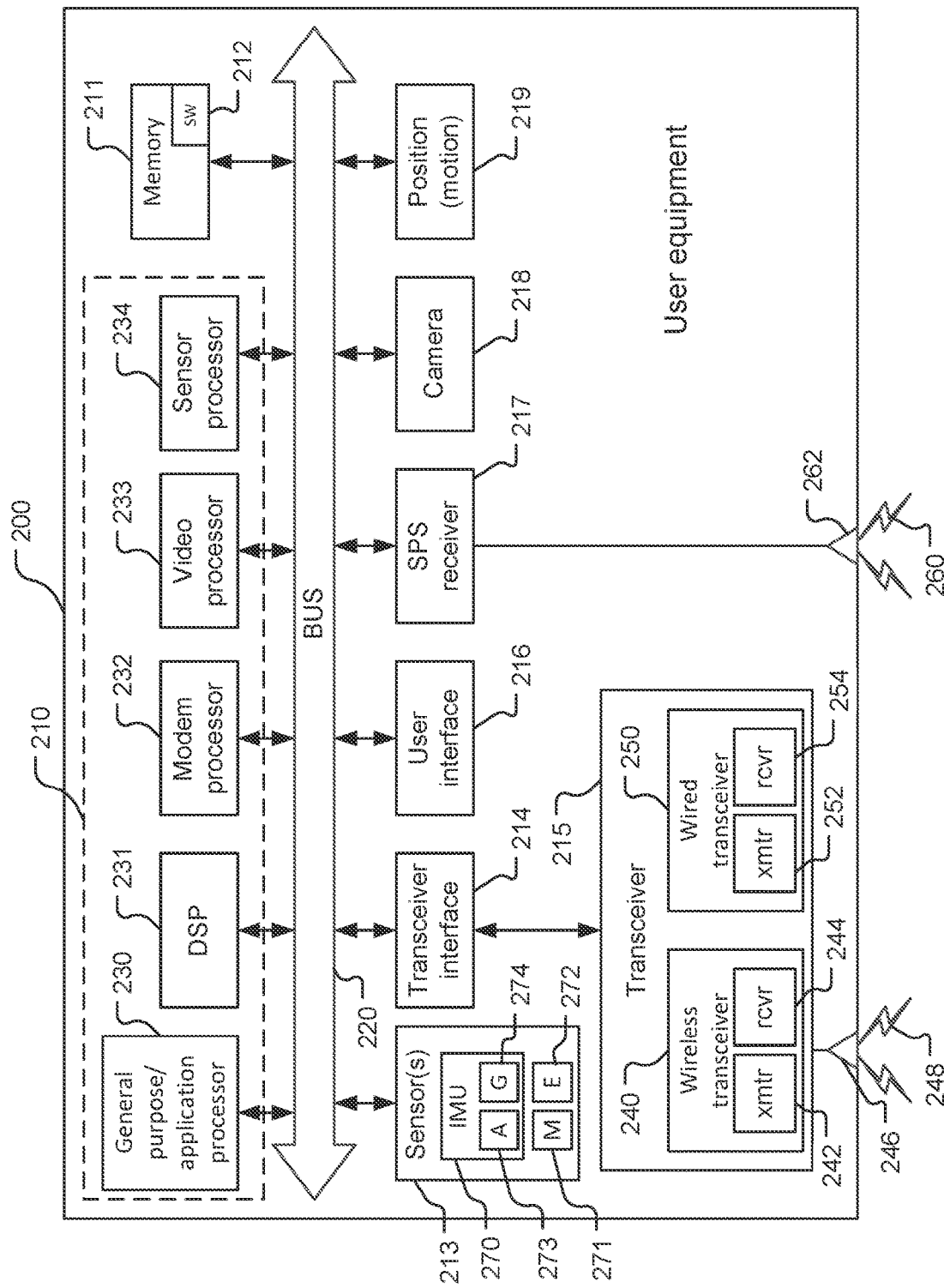
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations. The sensors processing subsystem may be embedded in a low power core that facilitates continuous logging and derivation of sensor parameters required for high level functions such as temperature sensing, location assist or dead reckoning.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee, 5G CV2X (Sidelink), UWB, 5G ProSe, etc. New Radio may use mm-wave frequencies and/or sub-6 GHz frequencies. The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured. e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
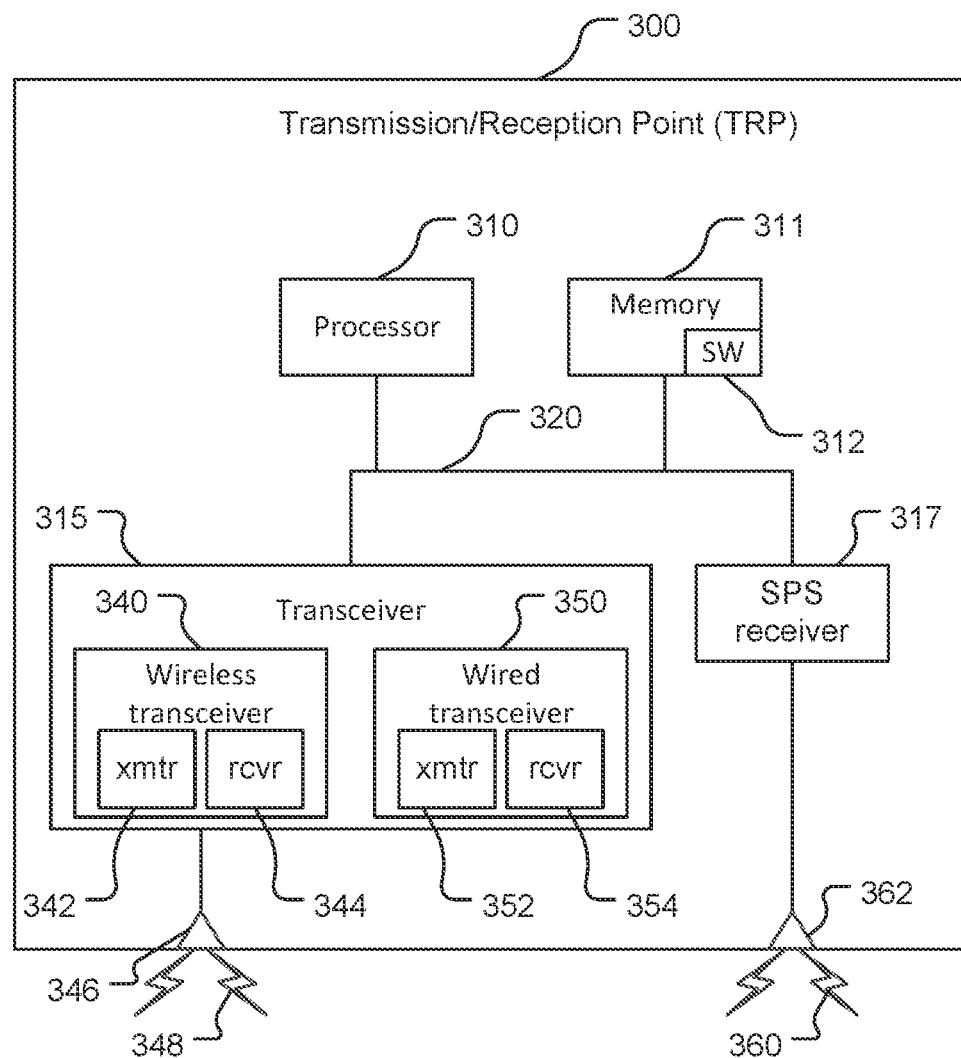
FIG. 3 is a block diagram of components of an example transmission/reception point shown in FIG. 1.

Referring also to FIG. 3, an example of a TRP 300 of the BSs (e.g., gNB 110a, gNB 110b, ng-eNB 114) comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee, UWB, etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
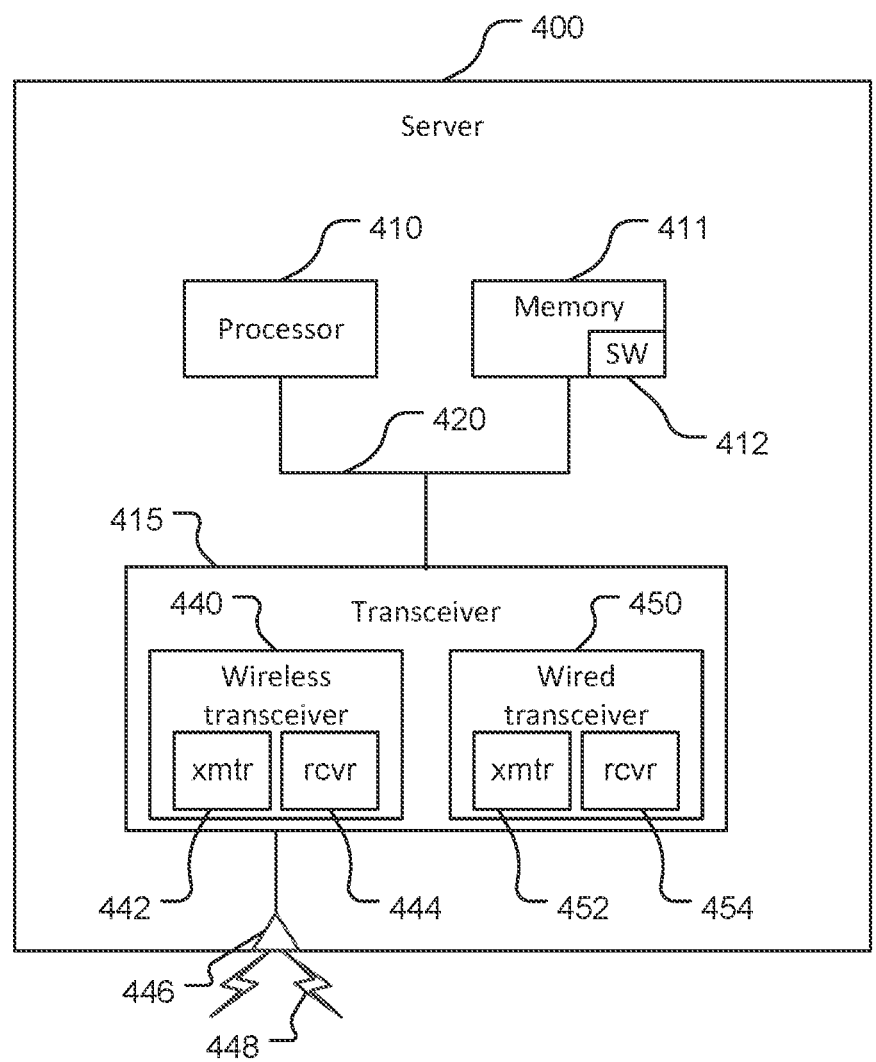
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices. e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee, UWB, etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
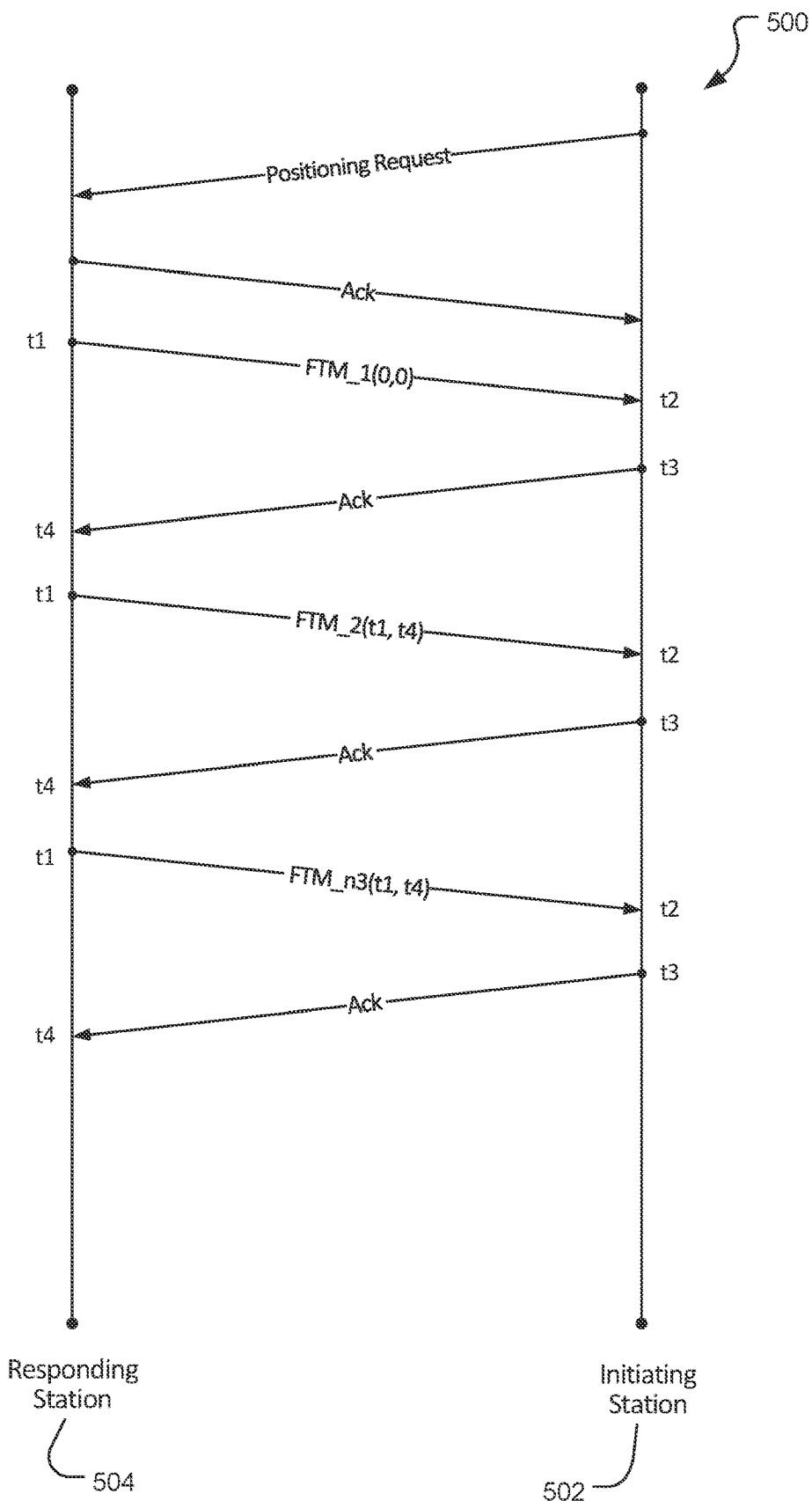
FIG. 5 is an example message flow for a round trip time measurement session.

Referring to FIG. 5, an example of a diagram of a round trip time measurement session 500 is shown. The general approach includes an initiating station 502 and a responding station 504. The initiating station 502 and the responding station 504 may be a UE such as the UE 200, or other wireless device configured to participate in time-of-flight based positioning. In an example, and not a limitation, the RTT measurement session 500 may be based on Fine Timing Measurement messages exchanged between the initiating and responding stations 502, 504. Other messages and signals such as positioning reference signals (PRS), sounding reference signals (SRS), Infra-Red camera signals, or other reference signals may be used to determine time-of-flight information between two UEs. The RTT session 500 may utilize a FTM Protocol (e.g., 802.11mc D4.3 section 10.24.6) to enable two stations to exchange round trip measurement frames (e.g., FTM frames). The initiating station 502 may request a positioning session and compute the round trip time by recording the TOA (i.e., t2) of the FTM frame from the responding station 504 and recording the TOD of an acknowledgement frame (ACK) of the FTM frame (i.e., t3). The responding station 504 may record the TOD of the FTM frame (i.e., t1) and the TOA of the ACK received from initiating station 502 (i.e., t4). The initiating station 502 may receive the time 't4' in subsequent FTM messages (e.g., FTM2(t1,t4). Variations of message formats may enable the timing values to be transferred between the initiating and responding stations 502, 504. The RT is thus computed as:

$$RTT=[(t4-t1)-(t3-t2)] \quad (1)$$

The RTT session 500 may allow the initiating station 502 to obtain its range with the responding station 504 (e.g., the range is equal to RTT/2 times the speed of light). An FTM session is an example of a ranging technique between the initiating station 502 and the responding station 504. Other ranging techniques such as TDOA, TOA/TOF may also be used to determine the relative positions of the two stations. Other signaling may also be used to enable a negotiation process, the measurement exchange(s), and a termination process. For example, Wi-Fi 802.11az ranging NDP and TP Ranging NDP sessions may also be used.

Figure 6:
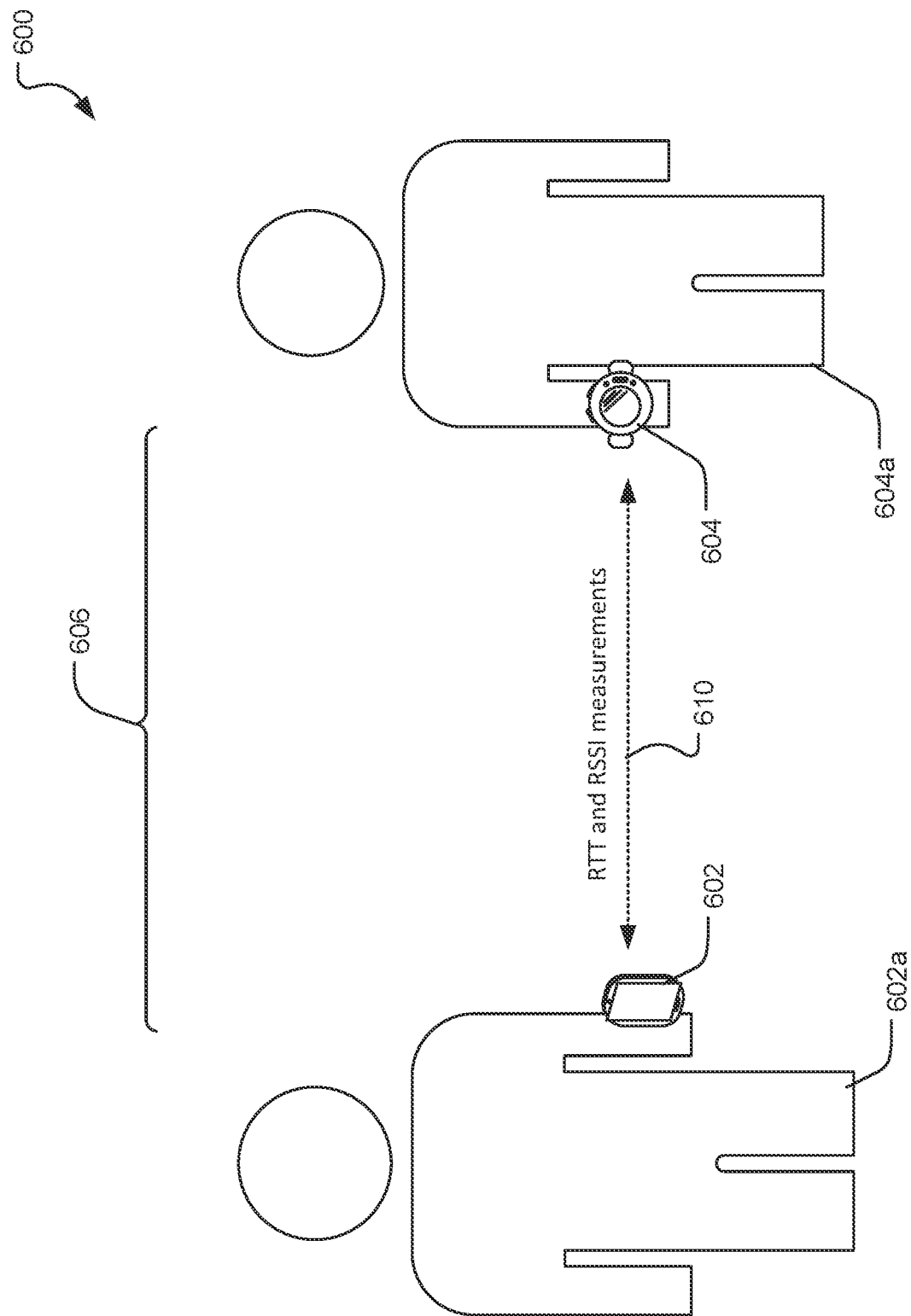
FIG. 6 is a diagram of an example proximity measurement.

Referring to FIG. 6, a diagram 600 of an example proximity measurement is shown. The diagram 600 includes a first mobile device 602 and an associated first user 602a, and a second mobile device 604 and an associated second user 604a. The mobile devices 602 and 604 may correspond to a cellphone, smartphone, smartwatch, smart glasses, laptop, tablet, PDA, tracking device, navigation device, IoT device, asset tracker, health monitors, wearable trackers, or some other portable or moveable wireless nodes configured for wireless communications. In an embodiment, one or both of the mobile devices 602, 604 may be stationary wireless nodes such as an AP. A barrier detection application may establish a contact range 606 based on the effective range of a wireless technology. The mobile devices 602, 604 may exchange RF signals 610 to determine a range between the users 602a, 604a. The RF signals may be based on existing wireless technologies such as, for example, IEEE 802.11 (including IEEE 802.11p), WiFi, WiFi Direct (WiFi-D), Bluetooth®), Zigbee, 5G NR, side link protocols, UWB, and other device-to-device (D2D) interfaces. In an example, the RF signals 610 may include messages for a ranging technique (e.g., RTT, TDOA, TOA) and/or for determining a signal strength measurement (e.g., RSSI). In an example, the mobile devices 602, 604 may be configured to determine angle-of-arrival (AoA) information of the received RF signals 610. The RF signals 610 may be used to perform a range measurement to determine the distance between the first and second mobile devices 602, 604. The mobile devices 602, 604 may be configured to report the presence of one another to a network, to one or more applications executing on the devices 602, 604, and/or notify a respective user 602a, 604a via a user interface.

Figure 7:
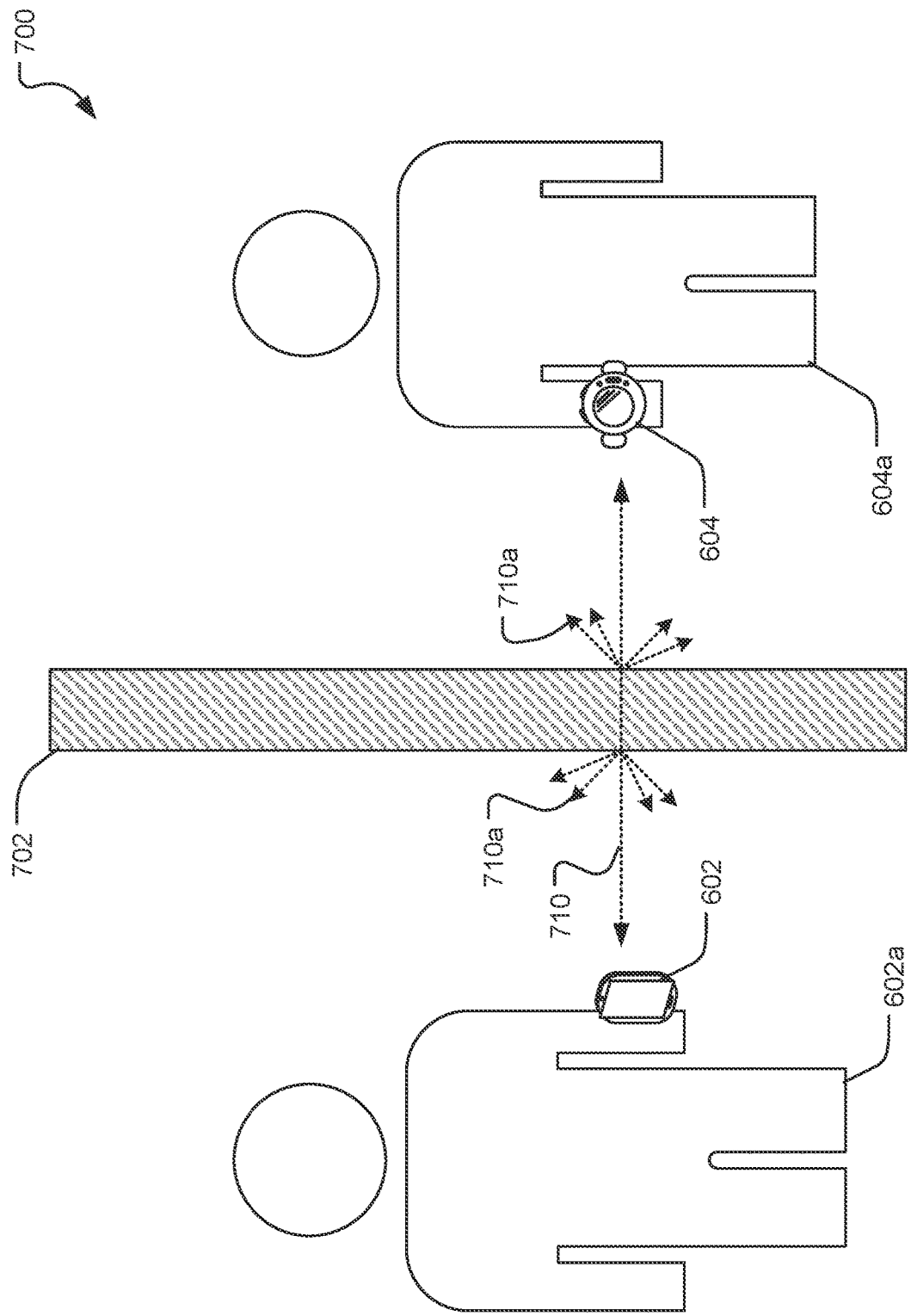
FIG. 7 is a diagram of an example proximity measurement through a barrier.

Referring to FIG. 7, with further reference to FIG. 6, a diagram 700 of an example proximity measurement through a barrier 702 is shown. As depicted in the diagram 700, the barrier 702 is disposed between the first user 602a with the first mobile device 602, and the second user 604a with the second mobile device 604. The barrier 702 may be a wall, window, floor, ceiling or other object disposed between two users. For example, groups of objects may also act as barriers, such as traffic in a roadway, cars in a parking lot, people, a crowded bookshelf in a library, shelves in a grocery store or other aisle configurations such that the density and/or compositions of the objects may attenuate RF signals. The mobile devices 602, 604 may exchange RF signals 710 through the barrier 702, however, the barrier 702 may cause some signal attenuation 710a (e.g., reflection, refraction, absorption) of the RF signals 710. The physical attributes of the barrier 702 (e.g., dimensions, material composition, orientation, etc.) will impact the amount of the attenuation 710a of the RF signals 710 and thus will impact the strength of the RF signals 710 received by the mobile devices 602, 604. In general, the barrier 702 will not impact the time-of-flight (e.g., RTT, TDOA, TOA/TOD) based range measurements. The mobile devices 602, 604 may be configured to compare the range measurements with the signal strength measurements to detect the presence of the barrier 702. For example, a differential between an expected RSSI signal and the RTT based range measurement may be proportional to a probability that the RF signals 710 are travelling through the barrier 702. That is, the expected RSSI signal may be based on known signal propagation models (e.g., shadowing model). In an example, the range 'd' based on an RSSI may be determined based on a propagation equation such as:

$$\log 10 d=[L-20 \log 10(5745)+28]/24 \quad (2)$$

where, d is the range; and

L is the path loss (e.g., L=23 dBm−<RSSI value>).

A wireless node may utilize an indication that a barrier is present to modify the functionality of local applications in a variety of use cases. For example, the mobile devices 602, 604 may be configured to report the presence of a barrier to a network, to one or more applications executing on the mobile devices 602, 604, and/or notify a respective user 602a, 604a via a user interface.

Figure 8:
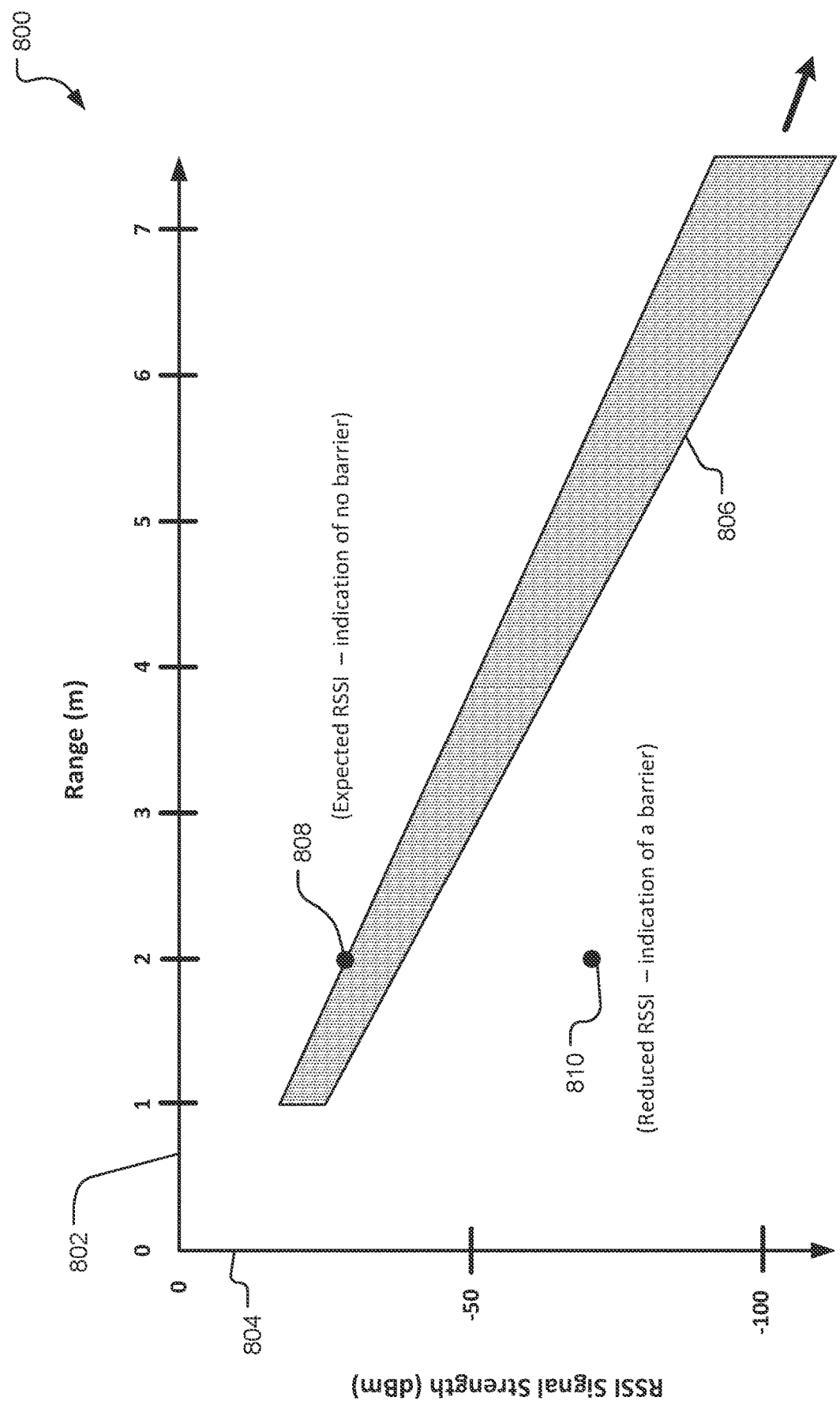
FIG. 8 is a graphical example of a probability function for detecting a barrier with radio frequency signals.

Referring to FIG. 8, a graphical example of a probability function for detecting a barrier with radio frequency signals is shown. A graph 800 includes a range axis 802 (in meters (m)) and a signal strength axis 804 (in decibel-milliwatts (dBm)). An example probability function 806 is plotted on the graph 800 to demonstrate the probable signal loss and growing uncertainty as a function of the range. The probability function 806, and the associated range and signal strength values are examples, and not limitations, as other probability functions may also be generated based on empirical observations and used to detect and classify a barrier. In an example, the range values may be based on RF signal measurements such as RTT based ranges and the probability function 806 may be a correlation of RTT based ranges and the corresponding RSSI measurements. Referring to FIG. 6, the RF signals 610 may correspond to a first measurement point 808 indicating a range of 2 m and a RSSI measurement of approximately −25 dBm. The RSSI measurement value for the first measurement point 808 is within, or greater than, the probability function 806 and thus indicates that no barrier is present between the mobile devices 602, 604. In contrast, referring to FIG. 7, the RF signals 710 may correspond to a second measurement point 810 indicating a range of 2 m and a RSSI measurement of approximately −70 dBm. The RSSI measurement value for the second measurement point 810 is less than the probability function 806 and thus indicates the presence of a barrier (i.e., the barrier 702) between the mobile devices 602, 604.

In an embodiment, the probability function 806 may be expressed as:

$$P(\text{Barrier}) \propto \Delta(\text{RangeEst}_{rssi}, \text{RangeEst}_{t\_flight}) \quad (3)$$

where the Δ function provides a metric of difference between the range estimates based on two relative positioning techniques. The metric may be binned (e.g., histogram bin) and the bin sizes may be implementation specific. In an example, the probability function may be expressed using a Bayesian estimation:

$$P(\text{Barrier} \mid d) = \frac{P(d \mid \text{Barrier}) * P(\text{Barrier})}{P(d)} \quad (4)$$

where 'd' is an indication of a metric falling in the $d^{th}$ bin;
P(d|Barrier) may be measured by empirical data:
P(Barrier) is the Apriori probability that two devices have a barrier between them;
P(d) is the Apriori probability of difference metric corresponding to the measured value.

In an embodiment, the probability function 806 may be based on crowdsourced empirical data provided to one or more network servers from a large number of devices in a wireless network. In an example, one or both of the mobile devices 602, 604 may be configured to provide the RTT and RSSI range measurements and their current locations to a crowdsourcing server. Other information associated with a potential barrier such as an optical image (e.g., via a camera) or radio frequency (RF) sensing information, ultrasound measurements, or other measurements based on the capability of the mobile device may be provided to the crowdsourcing server.

Figure 9:
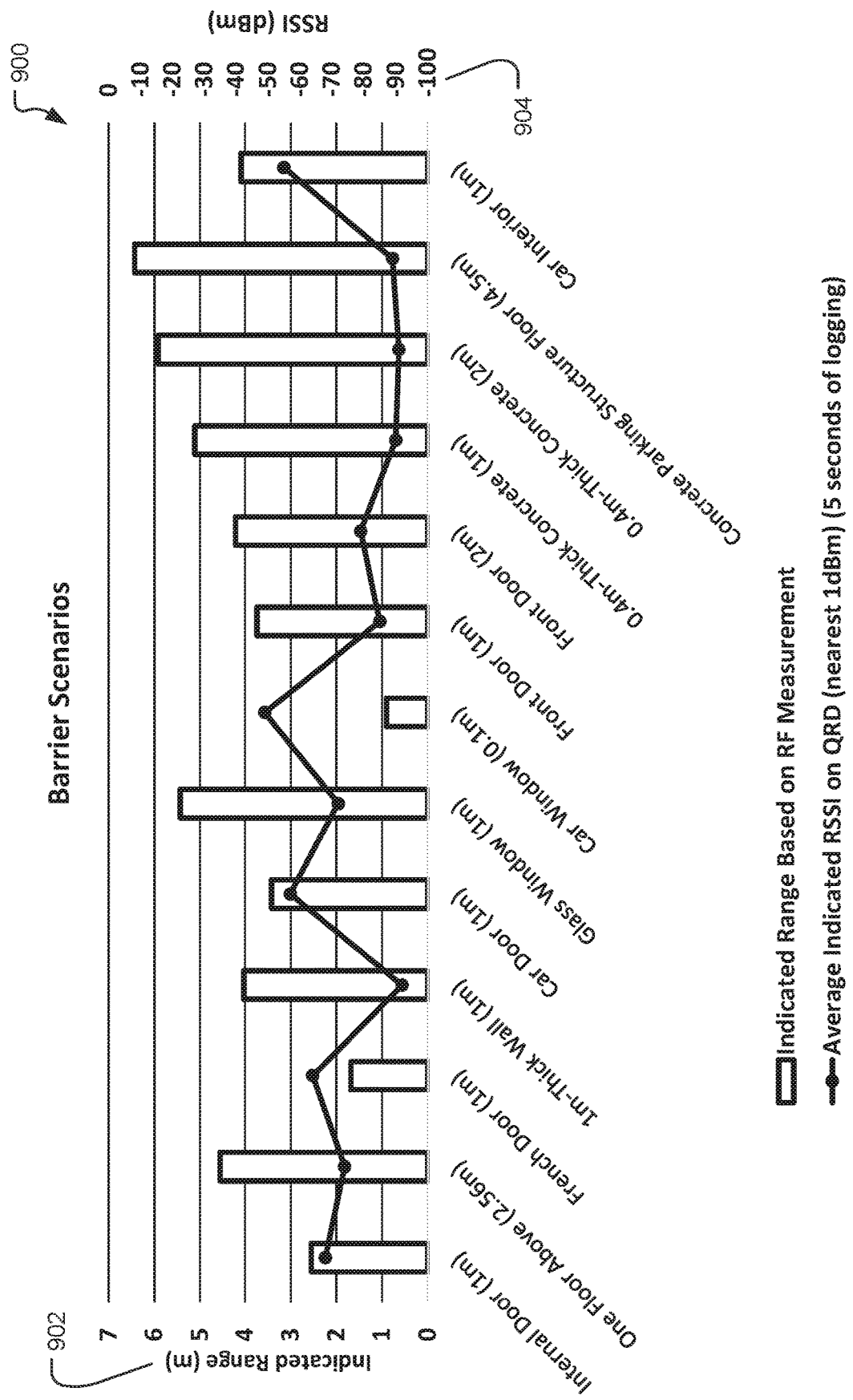
FIG. 9 is a graph of example barrier scenarios.

Referring to FIG. 9, a graph 900 of example barrier scenarios is shown. The barrier scenarios and corresponding measurement values are examples and not limitations as other materials and measurements may be used to derive probability functions and classification models. The graph 900 includes an indicated range axis 902 and a RSSI measurement axis 904. The indicated ranges are based on RTT measurements through the indicated barrier and the RSSI measurements represent the average RSSI over 5 seconds of logging. As indicated in the graph 900, the RSSI measurements may be significantly impacted based on the barrier material. As expected, denser structures such as concrete attenuate the RF signals more than less dense structures such as an internal door. A probability function may be generated based on large samples of different barrier scenarios and used to predict the presence and classification of a barrier based on the ranging and signal strength measurements. In an example, RF signals may be measured in different frequency layers and the corresponding differences in attenuation may be used to further classify a barrier. In an embodiment, machine learning techniques may be used to further characterize the time based range measurement and signal strength measurements based on the composition of the barrier.

Figures 10A, 10B:
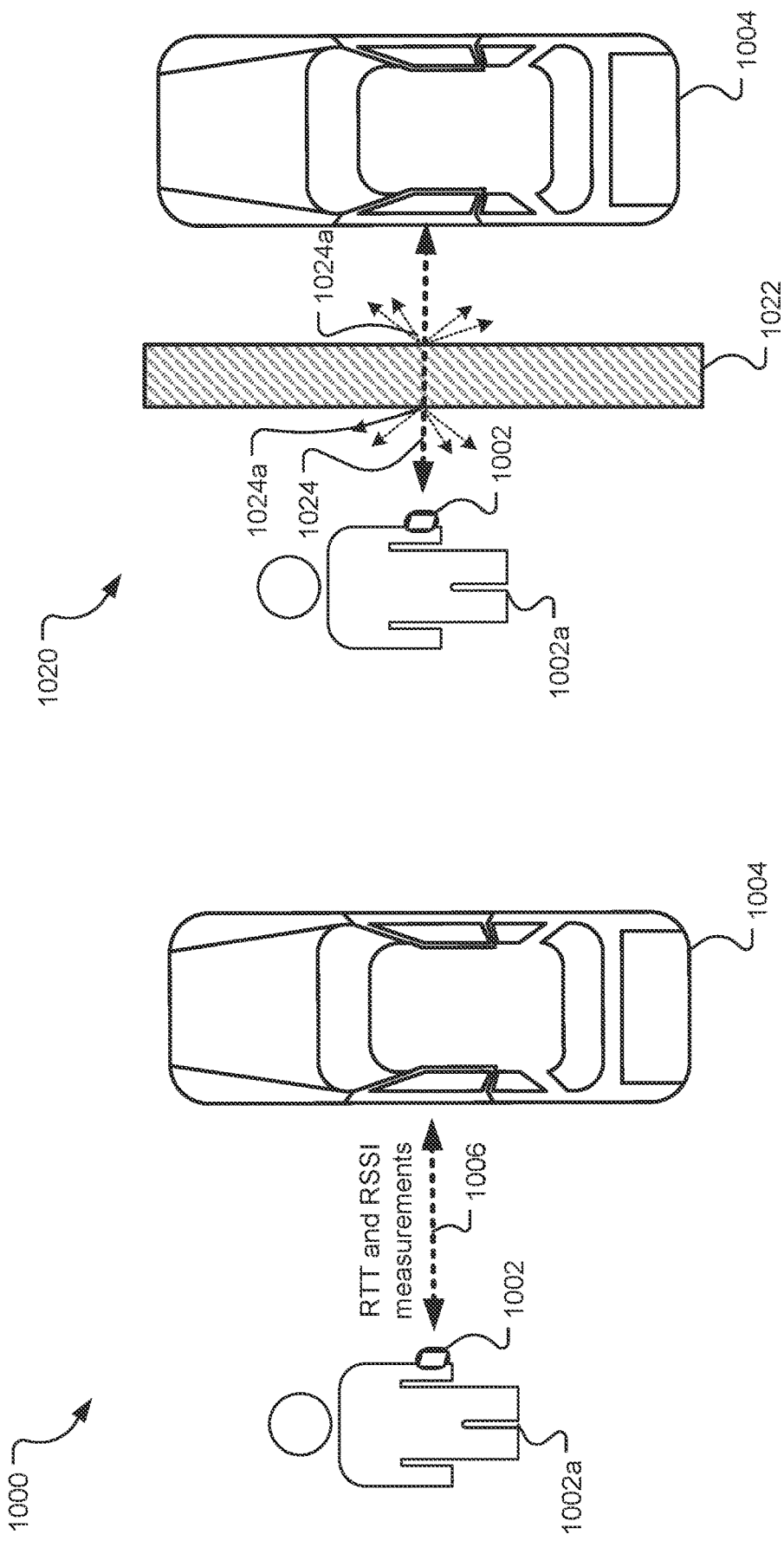
FIGS. 10A and 10B are diagrams of an example vehicle locking and unlocking system utilizing barrier detection.

Referring to FIGS. 10A and 10B, an example vehicle locking and unlocking system utilizing barrier detection is shown. In general, the number of vehicle manufacturers using digital keys (e.g., key fobs) for access is increasing year over year. Vehicles may be configured to automatically provide access to the user based on the proximity of the digital key. In such use cases, detecting a barrier type is helpful in distinguishing between situations when the user is located next to a vehicle without a barrier, or situations when a barrier comprised of glass (e.g., a vehicle window) is between the user and a transceiver in the vehicle and when a more substantial barrier such as concrete or wood (e.g., floor, garage door, etc.) is disposed between the user and the vehicle. The RTT and RSSI techniques described herein may reduce false positives which may occur with the previous RSSI based digital key techniques. For example, a first diagram 1000 depicts a UE 1002 (e.g., smartphone, key fob, etc.) configured to enable a user 1002a to provide key information to lock or unlock a vehicle 1004. The vehicle 1004 may include a wireless node (not shown in FIG. 10A) configured to send and receive RF signals. In an example, the UE 1002 and the vehicle 1004 may exchange RF signals 1006 to determine a range between them. The RF signals may be based on existing wireless technologies such as, for example, IEEE 802.11 (including IEEE 802.11p, 802.11mc, 802.11az), WiFi, WiFi Direct (WiFi-D), Bluetooth®, Zigbee, 5G NR, side link protocols, UWB, and other device-to-device (D2D) interfaces. The RF signals 1006 may include messages for a ranging technique (e.g., RTT, TDOA, TOA) and/or for determining a signal strength measurement (e.g., RSSI). For example, Wi-Fi 802.11az ranging NDP and TP Ranging NDP sessions may be used. In an example, the UE 1002 and/or the vehicle 1004 may be configured to determine the AoA of the received RF signals 1006. When the UE 1002 is within an established range threshold, the lock/unlock functions on the vehicle 1004 are enabled.

In a second diagram 1020, a barrier 1022 is disposed between the user 1002a and the vehicle 1004. The UE 1002 and the vehicle 1004 may exchange RF signals 1024 through the barrier 1022, but the barrier 1022 may cause some signal attenuation 1024a (e.g., reflection, refraction, absorption) of the RF signals 1024. The material composition and other physical features of the barrier 1022 (e.g., dimensions, orientation, etc.) will impact the amount of the attenuation 1024a of the RF signals 1024 and thus will impact the strength of the RF signals 1024 received by the UE 1002 and the vehicle 1004. In an example, if a difference between an RTT based distance measurement and a RSSI based measurement is above a threshold value, the lock/unlock function in the vehicle will be disabled (e.g., the user 1002a will be denied entry to the vehicle 1004). In an example, a second threshold value for the difference between RTT and RSSI distance measurements may be based on the attenuation caused by the presence of a window in the vehicle. Thus, the difference in the distance measurements may be used to detect whether a vehicle window is open or closed. The threshold values may be stored in a data structure, such as a look-up-table (LUT), in local memory in the UE 1002 or the vehicle 1004. In an example, the threshold values may be associated with a AoA measurement performed by the vehicle 1004 to enable different threshold values for different lines of approach to the vehicle. The threshold values in the LUT may be established during vehicle manufacturing and/or periodic calibration procedures.

Figure 10C:
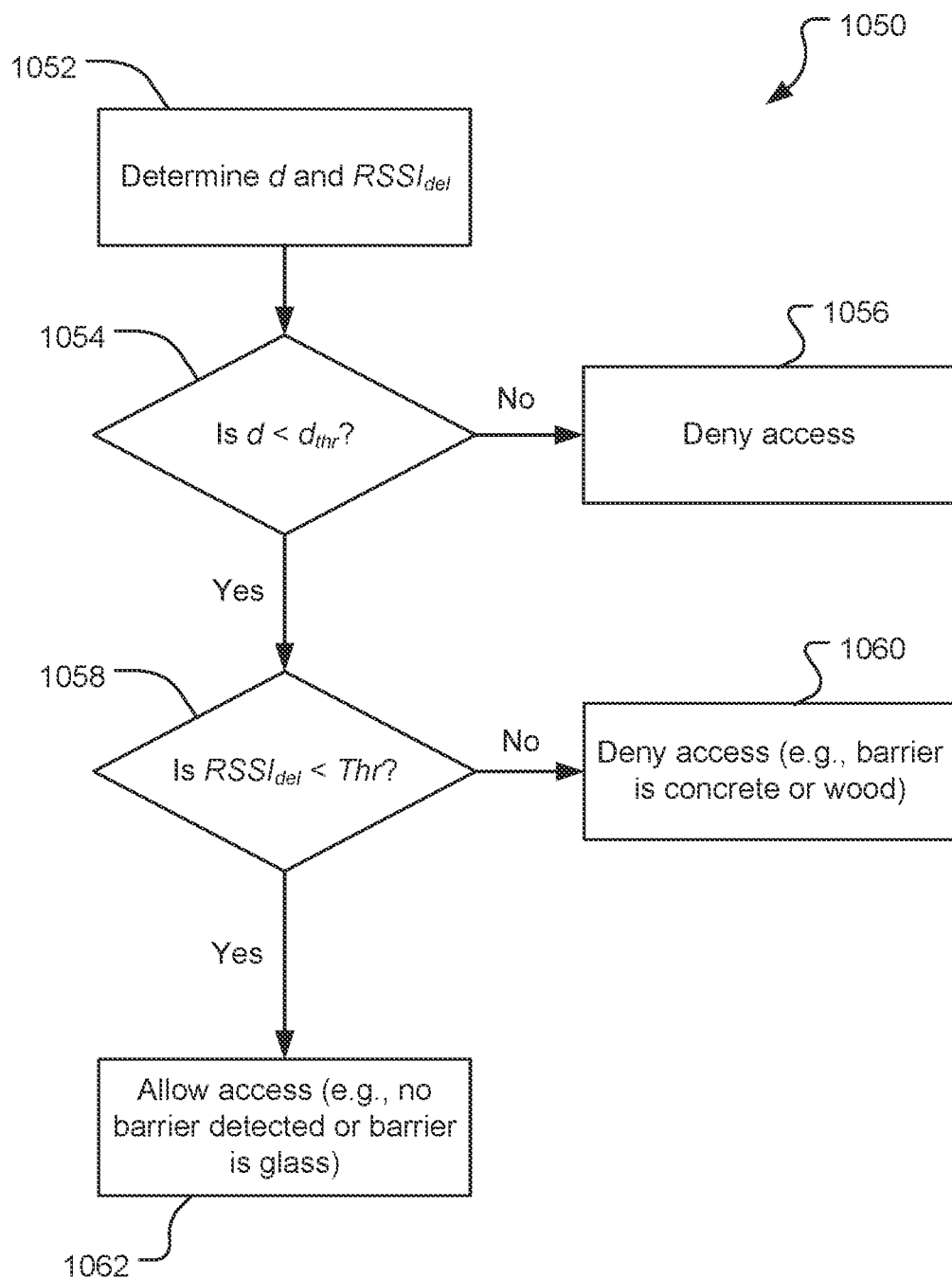
FIG. 10C is a process flow for an example method of granting access to a vehicle based in part on barrier detection information.

Referring to FIG. 10C, with further reference to FIG. 10B, a method 1050 for granting access to the vehicle 1004 based in part on barrier detection information includes the stages shown. The method 1050 is, however, an example and not limiting. The method 1050 may be altered, e.g., by having stages added, removed, rearranged, combined, performed concurrently, and/or having single stages split into multiple stages. In an example, the vehicle 1004 may include a wireless node, such as the UE 200 or the TRP 300, configured to perform the barrier detection techniques described herein. The vehicle 1004 is an example, and not a limitation, as the method 1050 may be used with other locking and security mechanisms. For example, the method 1050 may be used for granting access to a room, a storage box, activating a kiosk, accessing an Automated Teller Machine (ATM), or other areas or entities where a user's presence should be verified before granting access to the area or entity.

At stage 1052, the method includes determining a distance value "d" based on RTT or other ToF measurements, and a delta RSSI value. A TRP 300, including a processor 310 and a wireless transceiver 340, are a means for determining the distance value and the delta RSSI value. The UE 1002 and the vehicle 1004 are configured to obtain ToF and RSSI information based on an exchange of RF signals 1024. In an example, the TRP 300 in the vehicle 1004 is configured to determine an estimated RSSI value based on the distance value "d" obtained via a ToF technique (e.g., equation 2). The TRP 300 may measure the RSSI of the RF signals 1024 and determine the delta RSSI value based on the difference between the estimated and measured RSSI values.

At stage 1054, the method includes determining if the distance value "d" is less than a distance threshold value. The processor 310 is a means for comparing the distance value to a threshold. In an example, the ToF based distance measurement may be sufficient to determine that the UE 1002 is too far away from the vehicle 1004 to allow access. The distance threshold value may be a static value (e.g., 1 m, 2 m, 5 m, etc.) and the vehicle may be configured to remain locked until the user 1002a is within the threshold value. In an example, the distance threshold value may be based on other context information such as the location of the vehicle, the time of day, and/or an idle duration (e.g., how long has the vehicle been parked). For example, the distance threshold value may be decreased when the vehicle is located in a shopping area parking lot. The distance threshold values and context information may persist in a data structure (e.g., LUT) in the memory 311. If the distance value is greater than the distance threshold value, access to the vehicle is denied at stage 1056.

At stage 1058, the method includes determining if the delta RSSI value is less than a threshold value. The processor 310 is a means for comparing the delta RSSI value to a threshold value. In an example, referring to FIG. 9, one or more threshold values may be associated with different barrier types. The threshold value may be used to deny access if the barrier is of one type (e.g., concrete, wood) and enable access if the barrier is of another type (e.g., glass). For example, the threshold value may be associated with 0.4 m concrete wall and access will be denied at stage 1060 if the delta RSSI value is greater than the threshold value, or allowed at stage 1062 if the delta RSSI value is less than the threshold value.

Figure 11:
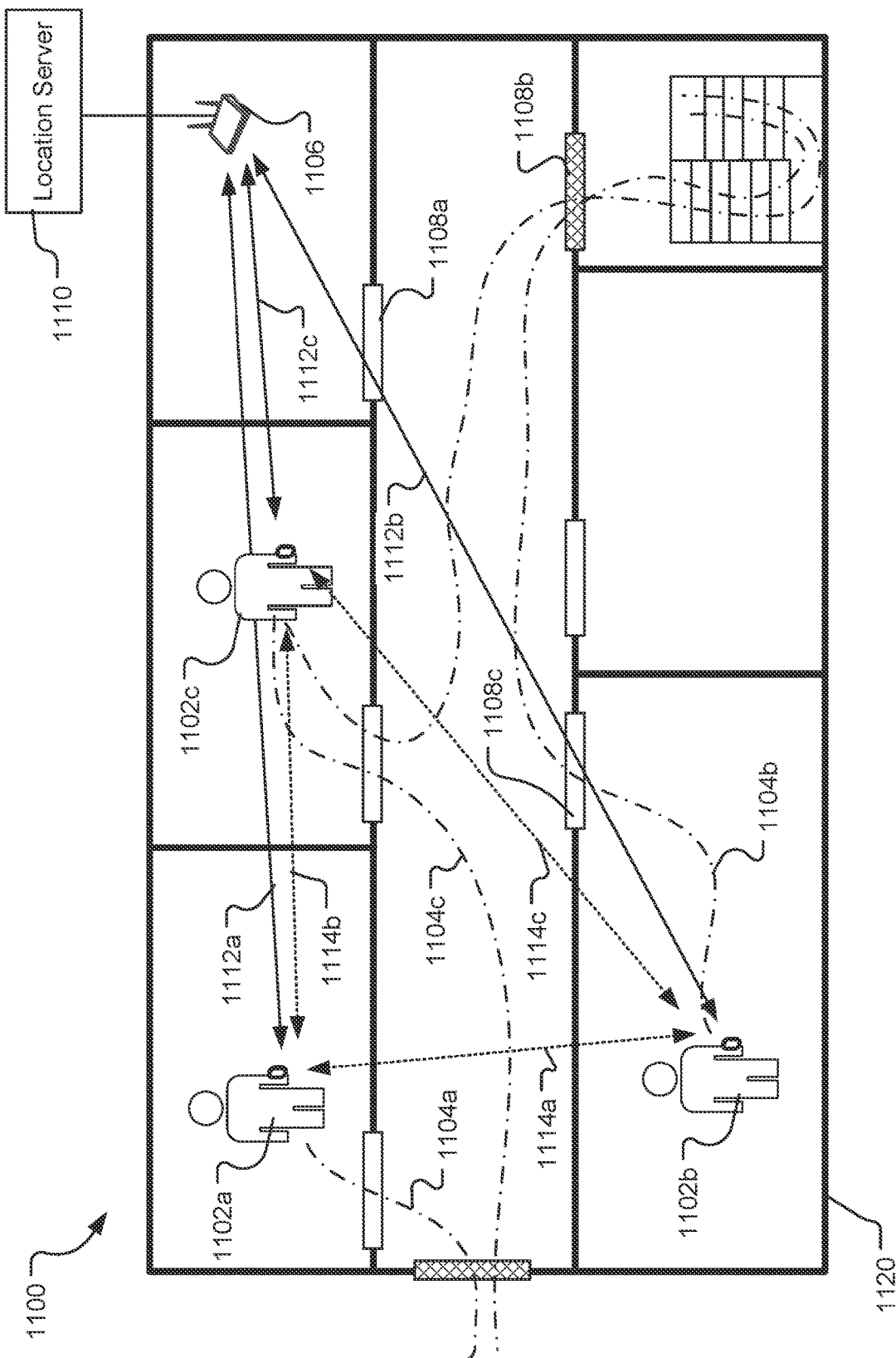
FIG. 11 is a diagram of an example use case for generating indoor maps based in part on barrier detection information.

Referring to FIG. 11, an example use case diagram 1100 for generating indoor maps based in part on barrier detection information is shown. The diagram 1100 includes an indoor area 1120 including a plurality of barriers such as walls and doors. In an example, the indoor area 1120 may include one or more wireless nodes, such as an AP 1106, configured to communicate with UEs and other devices located in or near the indoor area 1120 via radio access technologies as described herein. In operation, a plurality of users 1102a-c may carry respective UEs as they traverse around the indoor area 1120. For example, a first user 1102a may have travelled along a first path 1104a, a second user 1102b may have travelled along a second path 1104b, and a third user 1102c may have travelled along a third path 1104c. While the users 1102a-c are within range of the AP 1106, and/or one another, their UEs may be configured to exchange RF signals 1112a-c with the AP 1106 and/or to exchange RF signals 1114a-c with the other UEs in and around the indoor area 1120. The AP 1106 may obtain RTT and RSSI measurement values periodically (e.g., 0.5 sec, 1 sec, 2 secs, 5 secs, etc.) and report the measurement values to a location server 1110. The UEs may also periodically obtain RTT and RSSI measurement values (e.g., based on exchanges with one another or other wireless nodes) and report the measurement values to the AP 1106. Since the users 1102a-c, and more particularly their UEs, may regularly traverse the indoor area, the resulting RTT and RSSI information associated with the different location for each UE may be fused to provide an indoor map of barriers along with barrier types. Barrier type detection can be used to detect and distinguish doors from walls because doors are usually made of different material types as compared to walls. For example, the location server 1110 may be configured to apply the barrier detection techniques described herein to the collected RTT and RSSI measurements to determine the composition of a wooden door 1108a (e.g., on a server closet), a metal door 1108b (e.g., in a stair well), and a glass door 1108c (e.g., for a conference room). The resulting indoor map may be applied to a variety of different use cases such as contact tracing, indoor navigation for robots (e.g., cleaning robots, warehouse robots, etc.), assisted navigation for people with disabilities (e.g., locating exits/entrances). In an example, the RTT and RSSI measurements may be utilized to locate doors and windows and to determine the current state of a barrier (e.g., open and closed). The state information may be applied to routing algorithms (e.g., to prioritize paths with open doors over paths with closed doors). Other mapping applications may also utilize the barrier detection information.

Figure 12:
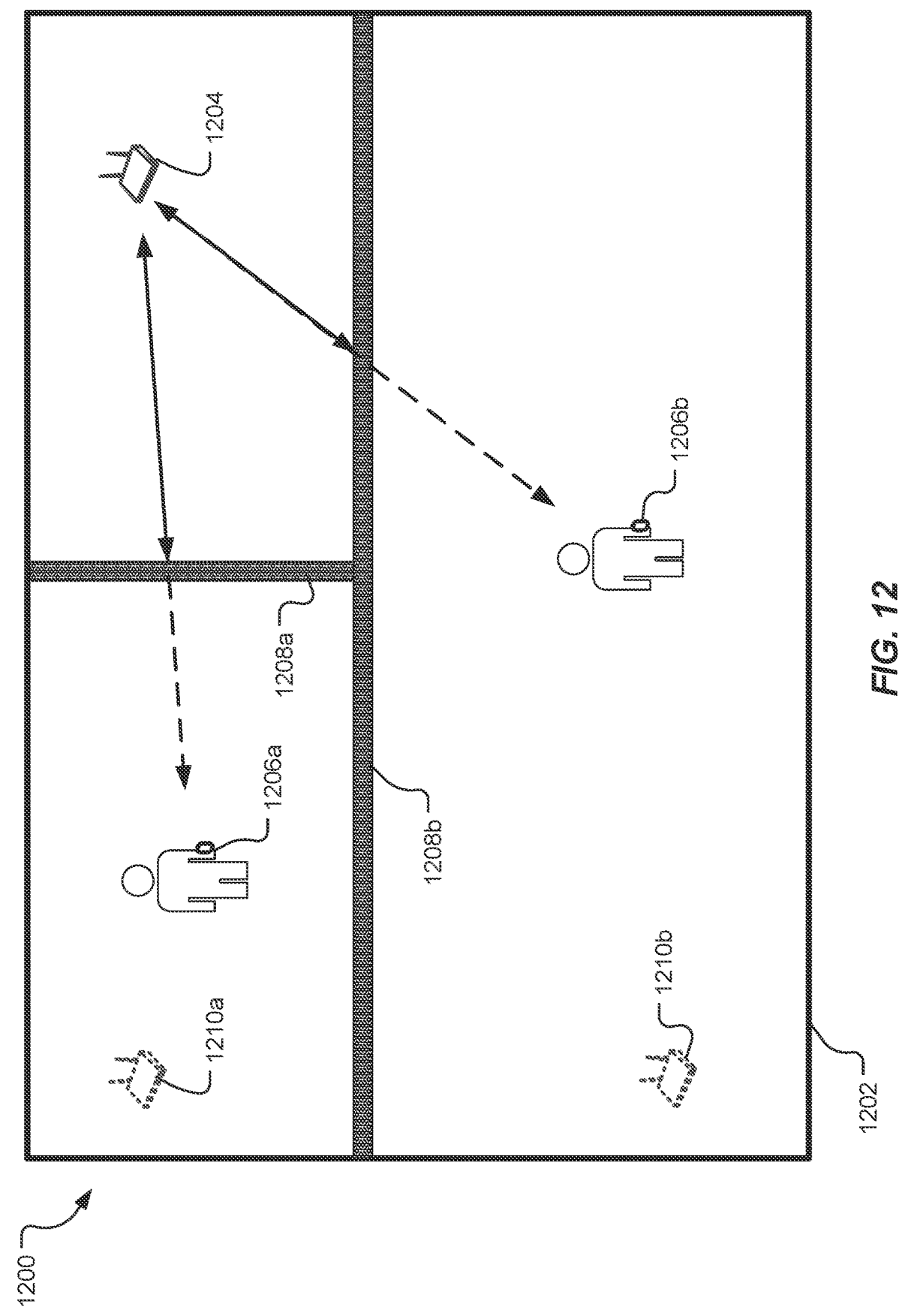
FIG. 12 is diagram of an example use case for improving network typology based on barrier type information.

Referring to FIG. 12, a diagram 1200 of an example use case for improving a network typology based on barrier type information is shown. Detecting barrier material types may be helpful in optimizing the number of APs needed in a particular building. For example, a building 1202 may have one or more structural walls 1208a-b which may attenuate signals from an AP 1204. One or more UEs 1206a-b in the building 1202 may be configured to exchange RF signals with the AP 1204 to determine barrier type information based on RTT and RSSI information as described herein. In an example, such barrier material type information may be used to determine whether to remove redundant APs which cover an area which already includes strong RF signals. Conversely, the barrier material type information may be used to add APs to areas which have poor signal coverage. For example, the measurements obtained by the UEs 1206a-b in their respective locations, and the resulting barrier type information associated with the walls 1208a-b, may lead to a decision to add additional APs 1210a-b as depicted in FIG. 12. The barrier type information may also help optimize transmit power to reduce power consumption, improve coverage, and maximize throughput of the network. In an example, the barrier type information may also be used to purposely generate a space that has less or no signal coverage in order to reduce RF signal interference within that space.

Figure 13A:
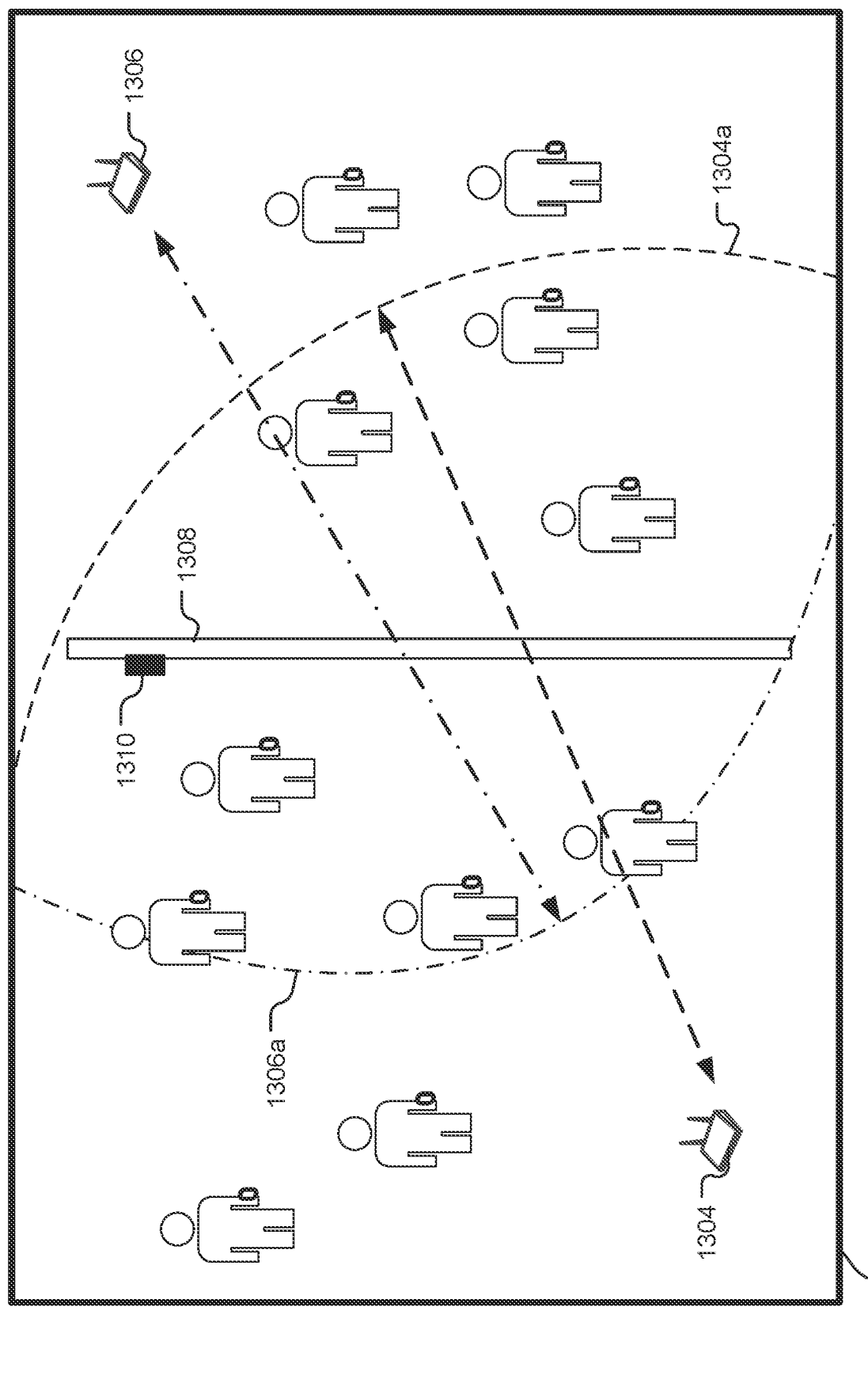
FIGS. 13A and 13B are diagrams of an example use case for utilizing barriers to improve network throughput.
Figure 13B:
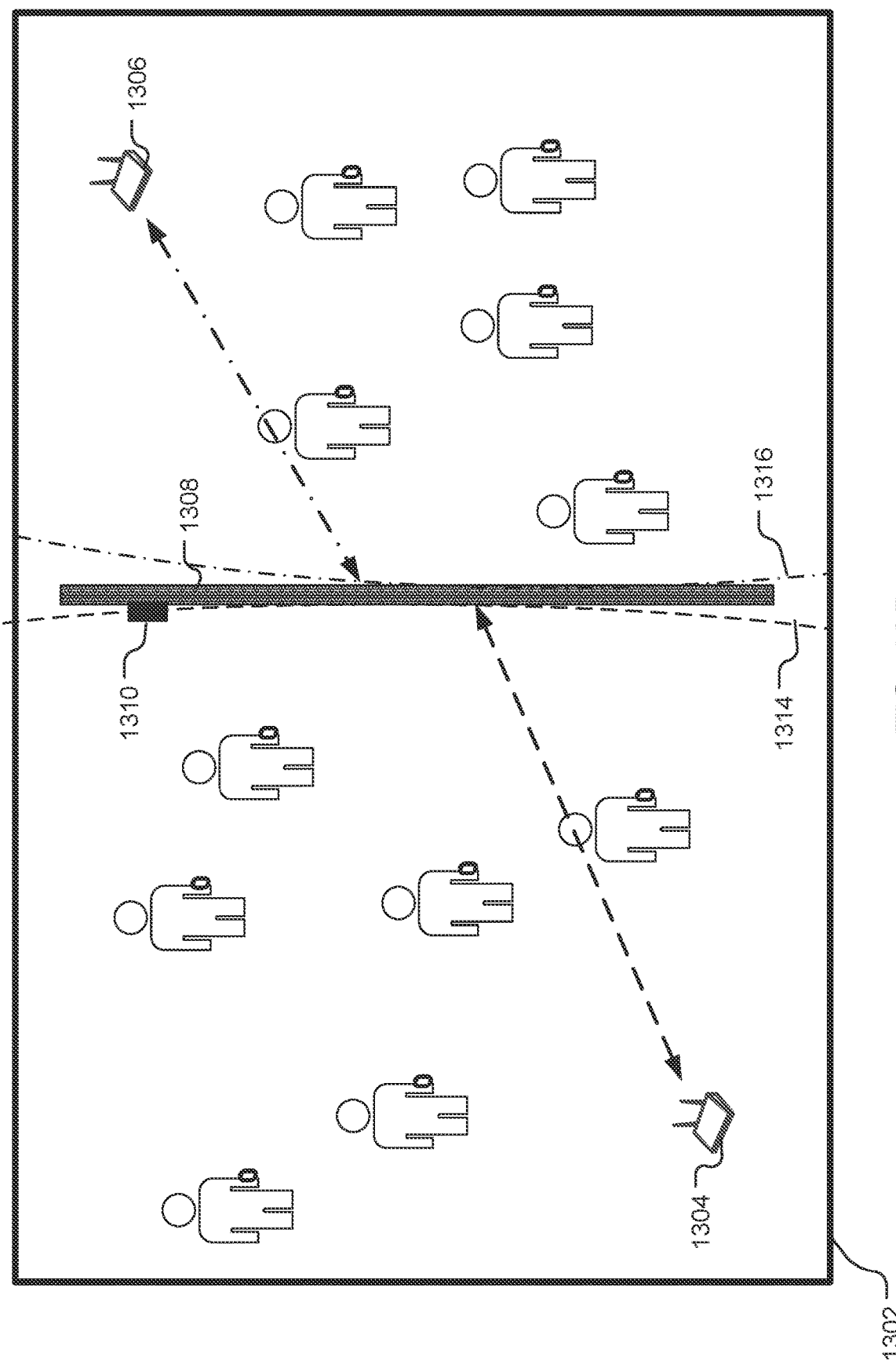

Referring to FIGS. 13A and 13B, diagrams of an example use case for using barriers to improve network throughput are shown. Popular venues, such as convention halls, sports arenas, theme parks, etc. may have several nodes to provide wireless services to users in the venue. For example, a venue 1302 may have a first AP 1304 with a first coverage boundary 1304a, and a second AP 1306 with a second coverage boundary 1306a. The coverage areas of the APs 1304, 1306 may overlap to ensure adequate wireless services to a plurality of users in the venue 1302. The overlapping coverage areas, however, may cause throughput issues for the network as the UEs in one of the coverage areas may attempt to use a single AP. Thus, one of the two APs is servicing an excess number UEs while the other AP is servicing fewer UEs. The excess number of UEs may cause unnecessary latency issues for the UEs. In an example, a physical barrier 1308 may be disposed within the overlapping coverage areas to bifurcate the area such that an equal number of users may be serviced by each AP. Referring to FIG. 13B, the physical barrier 1308 may be constructed with appropriate dimensions and material properties to limit the coverage areas of the APs 1304, 1306 to their respective sides of the physical barrier 1308. For example, the physical barrier 1308 may be configured to reduce the RSSI of signals transiting the barrier by −100 dBm. The presence of the physical barrier 1308 may, for example, reduce the coverage area of the first AP 1304 to a third coverage boundary 1314, and reduce the coverage area of the second AP 1306 to a fourth coverage boundary 1316. The dimensions of the coverage boundaries 1314, 1316 are examples, and not limitations, as the actual overlap between the areas may vary based on other possible signal paths in the venue 1302. Other materials and barrier configurations may also be used to reduce the coverage area(s) of one or more wireless nodes.

The physical barrier 1308 may be one or more temporary structures which may be relocated within the venue 1302 to achieve the desired balance of coverage and throughput for the respective APs. In an example, the physical barrier 1308 may be comprised of material(s) (e.g., set of antennas) configured to change the attenuation properties of barrier. In an example, a controller 1310 may include a near field communications (NFC) device configured to be used with a proximate UE to control the attenuation caused by the physical barrier 1308. The controller 1310 may be configured to communicate with one or more APs (e.g., via WiFi, BT, etc.) to receive control information. For example, UEs in the venue 1302 may be configured to report their respective RSSI measurements to the controller 1310, and the controller 1310 may be configured to modify the barrier attenuation properties (e.g., modify the RF power to the set of antennas in the barrier 1308) to achieve the desired bifurcation of the coverage areas.

Referring to FIGS. 14A and 14B, diagrams of example use cases for device-to-device (D2D) data sharing are shown. In a first diagram 1400, a first UE 1402 (associated with a first user 1402a) is sharing data with a second UE 1404 (associated with a second user 1404a) via a wireless link 1406. The wireless link 1406 may be WiFi, BT, UWB, or other sidelinks described herein configured for D2D data sharing. For example, the first user 1402a may desire to send the second user 1404a photograph, payment information, or other confidential information via the wireless link 1406. The barrier type detection techniques described herein may be utilized to help categorize proximate devices based on the corresponding RTT and RSSI information. For example, to distinguish between wireless nodes which are within line-of-sight (e.g., no barrier), wireless nodes which are behind 'heavy' barriers (e.g., walls, doors) and wireless nodes that are behind 'light' barriers (e.g., human body, backpack, table, etc.). Such barrier type information may be helpful to identify the intended devices for data sharing and pairing, especially for secure applications such as providing secure payment information. For example, referring to FIG. 14B, a second diagram 1420 includes an unseen attacker 1424a lurking behind a barrier 1422. The attacker is utilizing a third UE 1424 to attempt to initiate or otherwise intercept confidential information from the first user 1402a via a message exchange 1426 with the first UE 1402. In an example, the first UE 1402 may be configured to compare the RTT and RSSI information for the message exchange 1426 to detect the presence of the barrier 1422 (e.g., based on the attenuation 1426a), and halt any data exchange based on the detection of the barrier 1422. The reaction to the detection of a barrier may vary. For example, a threshold value such as described in FIG. 10C may be used to distinguish between 'heavy' and 'light' barriers such that the presence of a light barrier may not impede the data transfer.

Figure 15A:
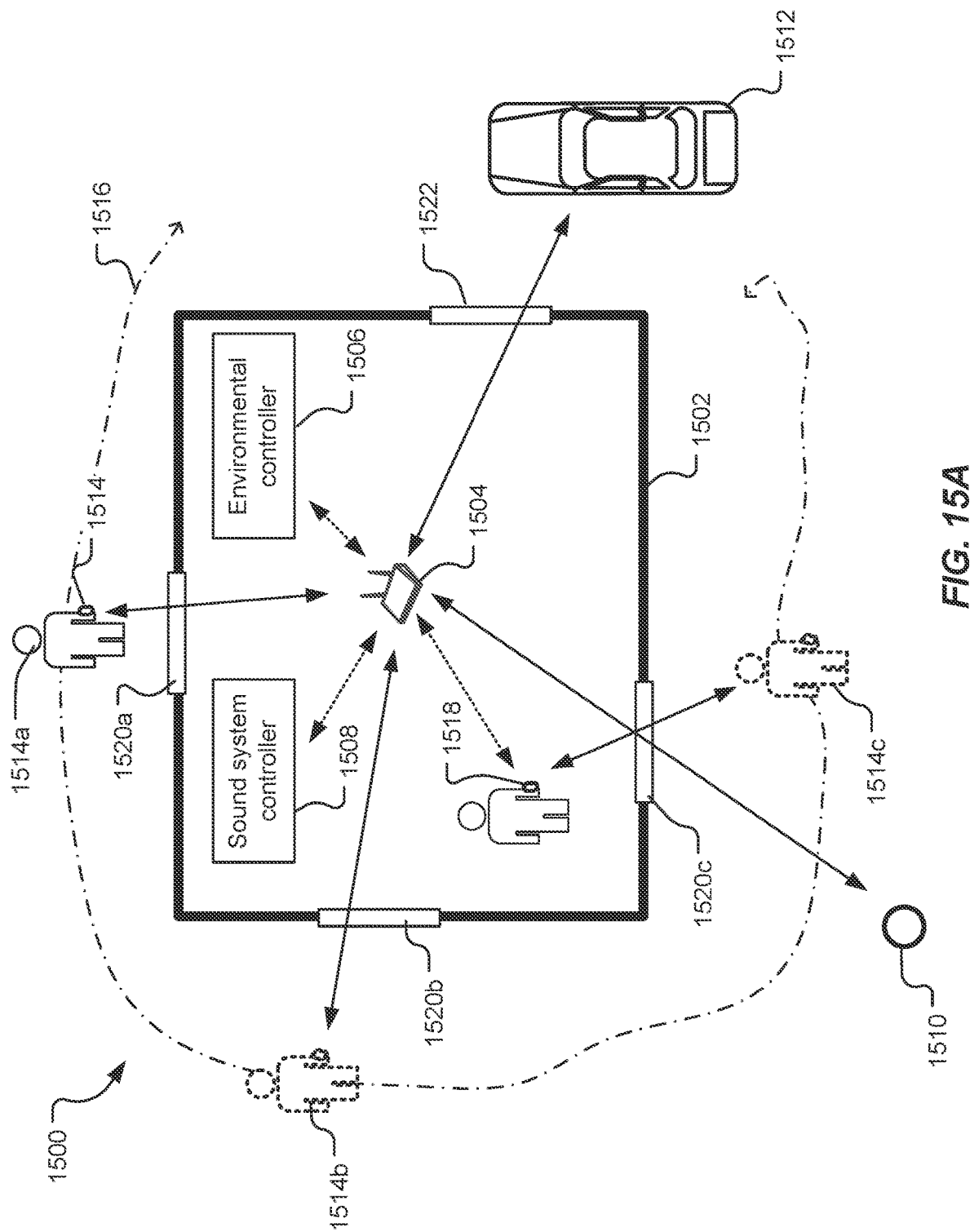
FIGS. 15A and 15B are diagrams of example use cases for utilizing barrier detection in a home network.
Figure 15B:
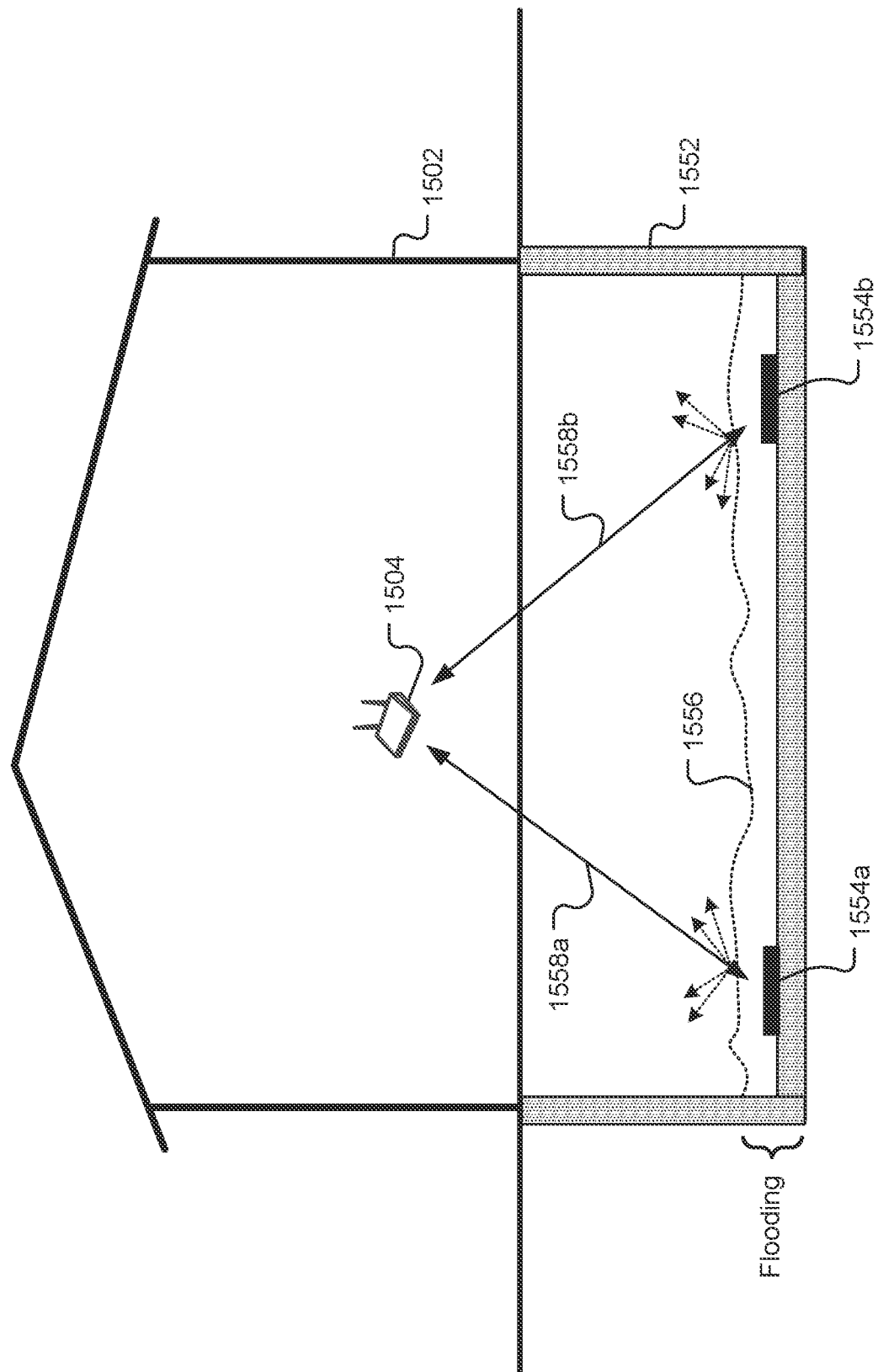

Referring to FIGS. 15A and 15B, diagrams of example use cases for utilizing barrier detection in a home network are shown. In a first diagram 1500, a home 1502 may include a plurality of wireless nodes, such as an AP 1504 and mobile devices including a first UE 1514, a second UE 1518, a vehicle 1512, and an outdoor camera 1510. Each of the wireless nodes in the first diagram 1500 are configured to communicate wirelessly via WiFi, BT, UWB, or other radio access technologies as described herein. The AP 1504 may be configured to communicate with one or more control systems in the home 1502. For example, the home may include one or more servers 400 configured to communicate with the AP 1504 via wired or wireless connections. In an example, the control systems may include an environmental controller 1506, a sound system controller 1508, and/or other controllers configured to control components in the home 1502. The barrier detection techniques described herein may be utilized to improve home comfort and security. For example, a user may transport the first UE 1514 around different locations of home 1502, such as long a trajectory 1516. In a first position 1514a, message exchanges between the UE 1514 and the AP 1504 may detect a first window 1520a. Message exchanges at a second position 1514b may detect a second window 1520b. Message exchanges between the second UE 1518 and the first UE 1514 at a third position 1514c may detect a third window 1520c. Message exchanges between the AP 1504 and the outdoor camera 1510 may also be used to detect the third window 1520c. Message exchanges between the AP 1504 and the vehicle 1512 may be used to detect a door 1522. The AP 1504, and other wireless nodes in the home 1502, may be configured to report the barrier detection information to a server 400 to enable the detection of state changes in the home. For example, variations in the detected barrier type information may be used to determine if a window or door are in an open or closed state. The barrier state information may then be used to help identify contextual information and how it applies to a user. The barrier state information may be utilized to identify when a door or a window is in an open or a closed state, which may be used as a factor in adjusting a device's parameters or identifying a user's preferences. For example, if the door 1522 is in a closed state, the user may enable the sound system controller 1508 to utilize a first speaker volume setting, whereas if the door is in an open state, the sound system controller 1508 may utilize a second speaker volume setting, or switch to a headphone setting. In an example, the environmental controller 1506 may be connected to a weather service and a thermostat device in the home 1502, and configured to activate a climate control (e.g., heat, air-conditioning) based on the state of the doors and windows, and other user preferences and/or historic routines. In an example, the RTT and RSSI based information may also be used in combination with RF sensing information obtained by one or more wireless nodes. For example, the AP 1504 may be configured to utilize monostatic and/or bistatic RF sensing techniques to determine the state of the home 1502.

In an example, referring to FIG. 15B, one or more wireless nodes such as IoT devices may be installed in the home 1502 to detect state changes such as flooding, intruders, or pests. The home 1502 may include a basement 1552 and a plurality of wireless nodes (e.g., IoT devices) may be disposed near the floor of the basement to detect flooding. A first IoT device 1554a and a second IoT device 1554b may be configured to send and receive RF signals with the AP 1504 as described herein. A change in the RTT and RSSI information associated with a respective first signal 1558a and a second signal 1558b may be an indication of flooding in the basement 1552. For example, a water level 1556 may cause attenuation in the signals 1558a-b. The environmental controller 1506 may be configured to receive the RTT and RSSI information from the AP 1504 and generate an alert to notify a user (e.g., via the first UE 1514) that there is flooding in the basement 1552. Other wireless nodes and barrier type information may also be used to detect a change in state in the home 1502. For example, a change in barrier type information of an outer wall due to termite infestation, carpenter bee damage, or other such pests which can change the density of a structure (e.g., by devouring and/or adding material for a nest) may be detected based on the RTT and RSSI information.

Figure 16A:
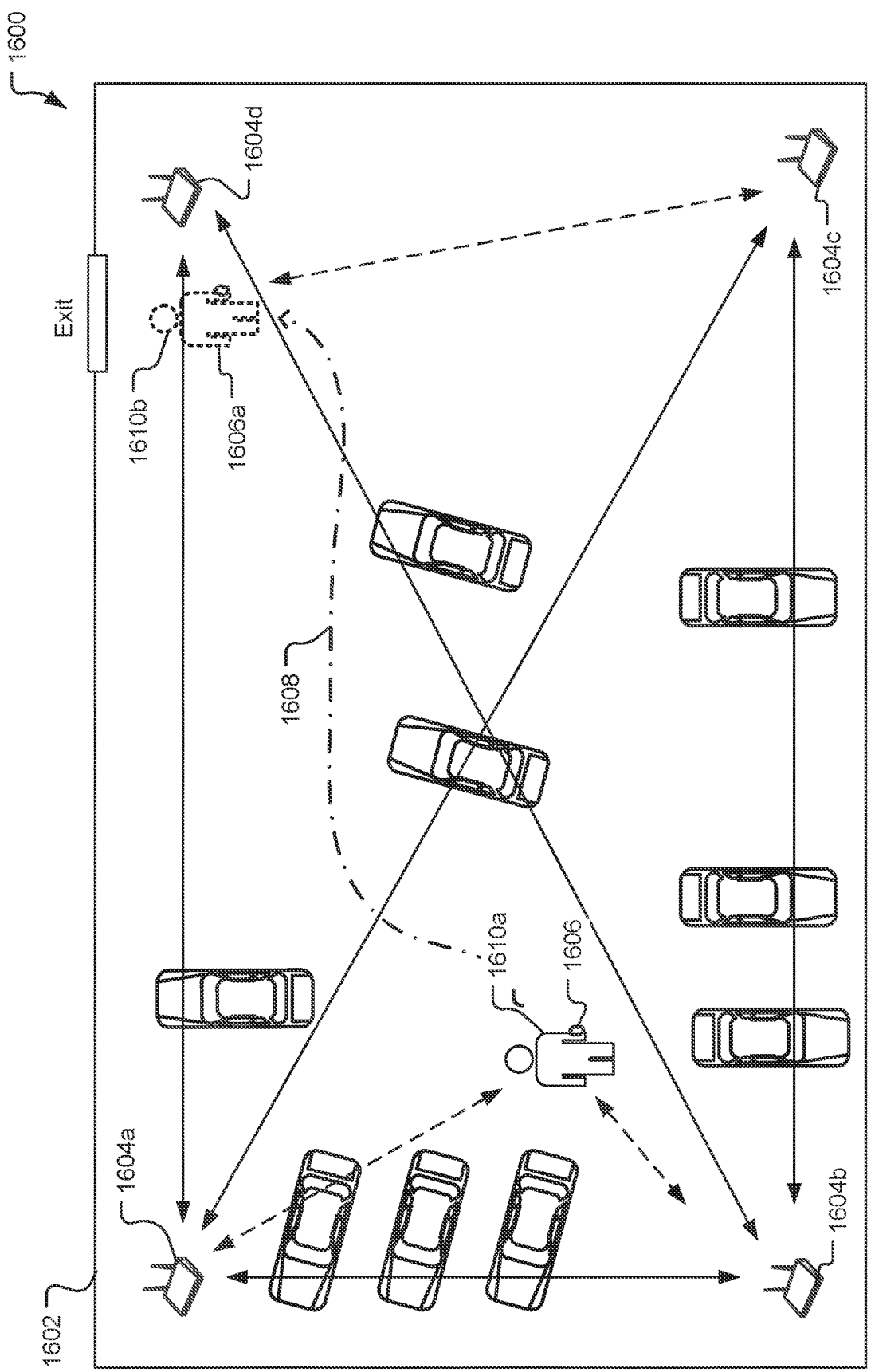
FIGS. 16A and 16B are diagrams of example use cases for determining a state of a local environment based in part on barrier detection techniques.
Figure 16B:
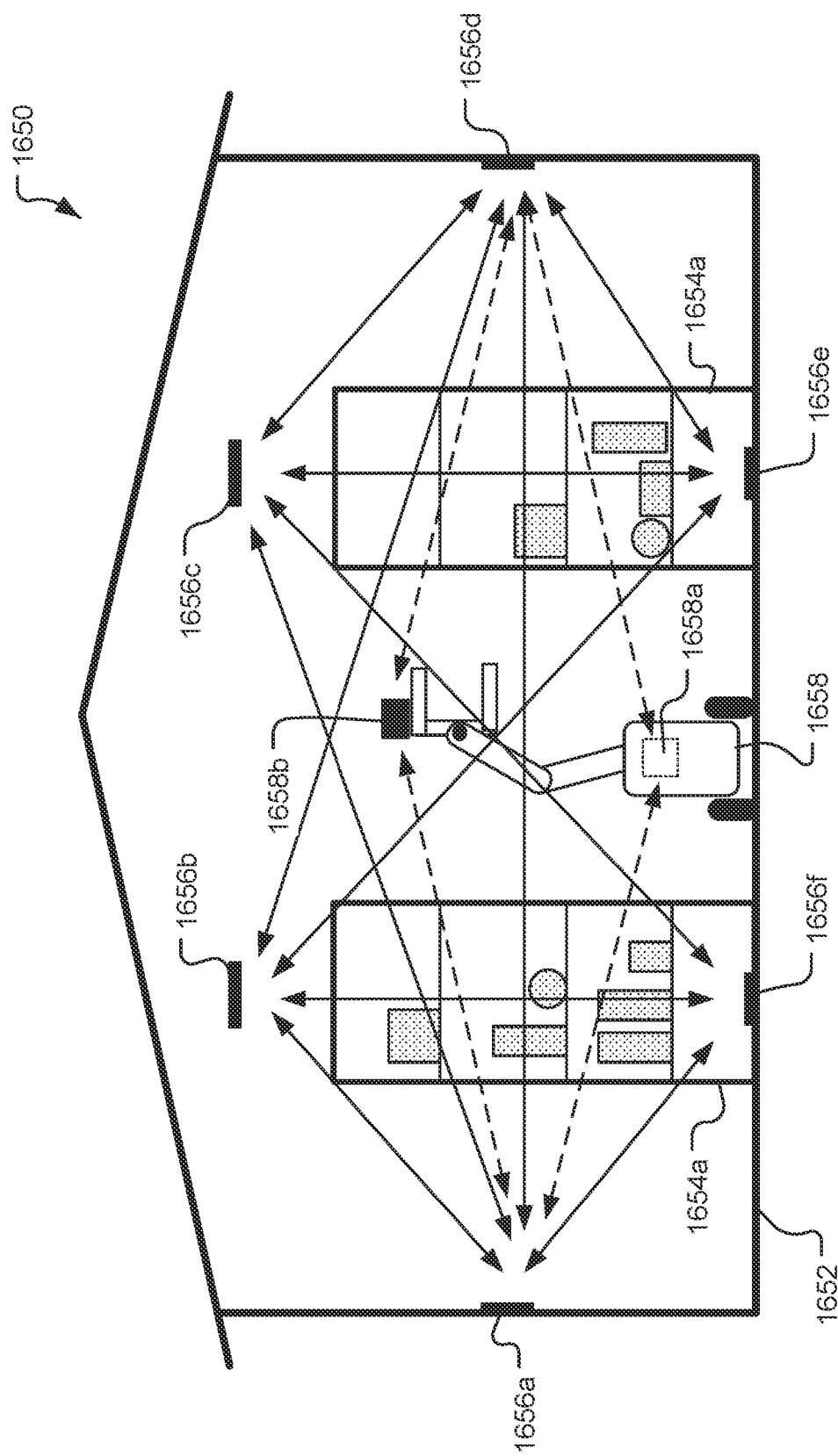

Referring to FIGS. 16A and 16B, diagrams of example use cases for determining a state of a local environment based in part on barrier detection techniques are shown. In a first diagram 1600, a vehicle parking structure 1602 includes one or more APs 1604a-d configured to obtain RTT and RSSI information from one another and/or from other mobile devices traversing through the parking structure 1602. For example, a user may carry a UE 1606 along a trajectory 1608 from a first position 1610a to a second position 1610b. The UE 1606 may be configured to exchange messages with one or more of the APs 1604a-d along the way. The APs 1604a-d may be to a server 400 (not shown in FIG. 16A) configured to collect and analyze barrier density information based on the signal exchanges. The resulting barrier information may be used to determine a general state (e.g., 10%, 20%, 50%, 80%, etc. of capacity) of the parking structure 1602. That is, when fewer vehicles are present the attenuation of the RF signals between the APs 1604a-d and the UE 1606 will be less than when there are more vehicles in the parking structure 1602. While FIG. 16A depicts a 2-dimensional (2D) arrangement of APs and UEs, 3-dimensional configurations may be used when a parking structure includes multiple levels. In an example, the APs 1604a-d and the UE 1606 may be configured to obtain RF sensing measurements to detect the presence of vehicles.

In a second diagram 1650, a warehouse 1652 may include a plurality of shelving units 1654a-b and proximate IoT devices 1656a-f. The IoT devices may include some or all of the components of a TRP 300 and are configured to exchange RF signals with one another and/or other mobile devices in the warehouse 1652. For example, a pick-and-place robot 1658 may be configured to move throughout the warehouse 1652 and/or the shelving units 1654a-b to place and/or remove inventory from the shelves. The robot 1658 may include one or more transceivers configured to communicate with the IoT devices 1656a-f via WiFi, BT, UWB, or other radio access technologies. For example, the robot 1658 may include a first transceiver 1658a in a body section and/or a second transceiver 1658b in an end effector. The RF signals transmitted through the shelving units 1654a-b may be used to determine the current state of inventory. For example, a retailer may utilize RTT and RSSI information described herein for bulk inventory management. Full boxes may be detected as barrier and indicate a first inventory level. Empty shelves may be detected as no barrier to indicate a second inventory level (e.g., low inventory). In an example, the box material type may be utilized to indicate that one or more items are present in the shelving units 1654a-b, whereas empty shelves in the shelving units 1654a-b are typically metal which can be classified as a different state (e.g., associated with empty shelves). The robot 1658 is an example, and not a limitation, as other automated devices (e.g., drones, collaborative bots, mobile racks, roaming shuttles, autonomous mobile robots, sorters, etc.) may be configured to exchange RF signals with one another and/or other wireless nodes, and the corresponding RF signals may be analyzed based on the RTT and RSSI techniques provided herein.

Figure 17:
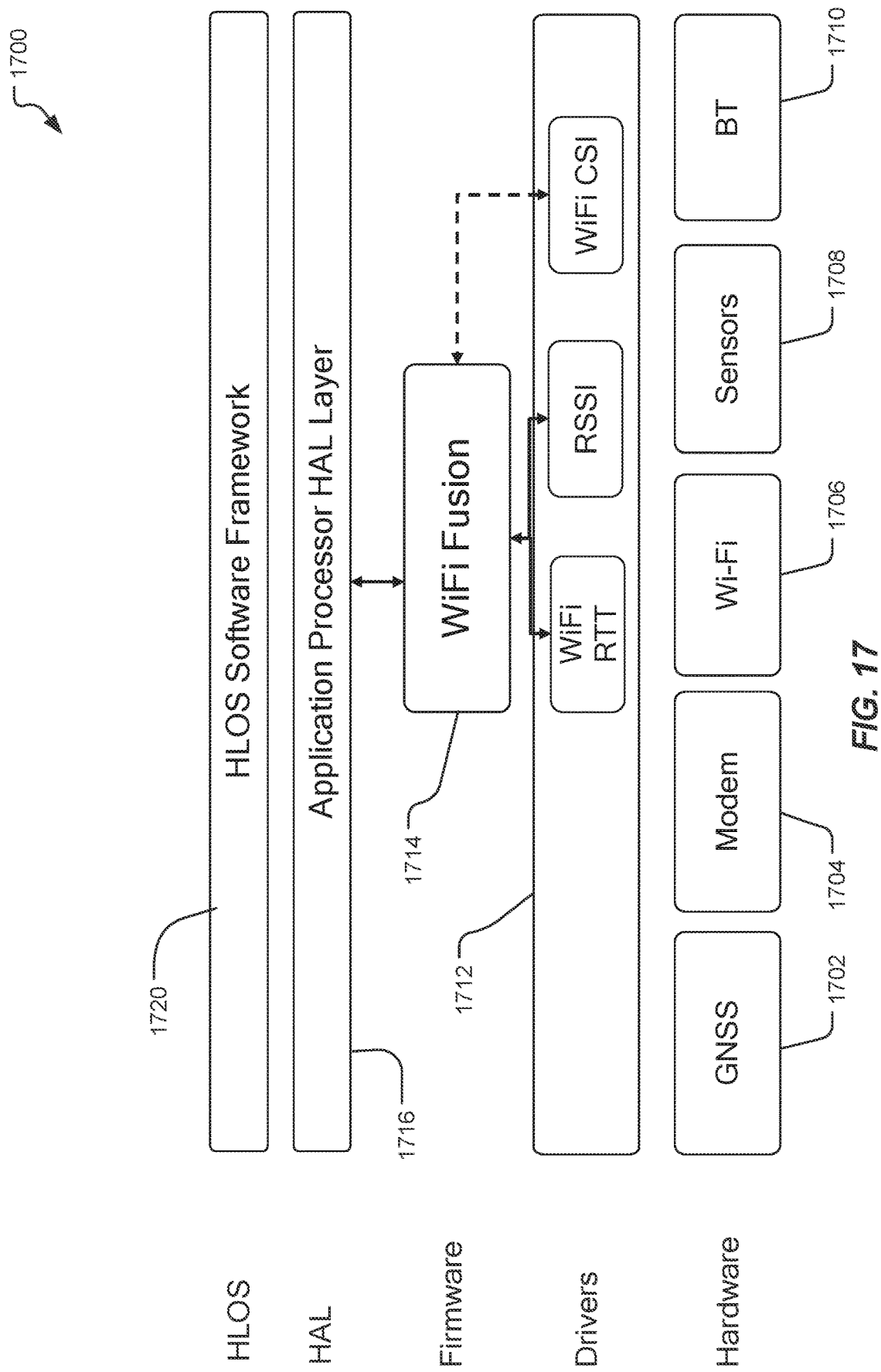
FIG. 17 is an example framework diagram of a user equipment for barrier detection.

Referring to FIG. 17, with further reference to FIG. 2, an example framework 1700 diagram of a user equipment for barrier detection is shown. The framework 1700 is an example of a framework utilized by the wireless nodes such as the UEs, APs, and IoT devices described herein. In an example the framework 1700 may include hardware modules such as a GNSS module 1702, a modem module 1704, a WiFi transceiver 1706, a sensors module 1708 and a BLUETOOTH (BT) transceiver 1710. The GNSS module 1702 may include a SPS receiver 217, the modem module 1704 may include a modem processor 232, the WiFi transceiver 1706 may include a wireless transceiver 240, the sensors module 1708 may include a sensor processor 234, and the BT transceiver 1710 may include a wireless transceiver 240. A drivers layer 1712 may include instructions to configure the WiFi transceiver 1706 and/or the BT transceiver to perform ranging and signal strength measurements. In an example, the UE 200 may include a plurality of transmit and receive antenna pairs and the WiFi transceiver may be configured to determine channel state information (CSI) for the various antenna pairs. In an embodiment, a WiFi Fusion firmware module 1714 may include hardware and software components to obtain RF signal measurements and reduce the demand on the application processor (e.g., the general-purpose processor 230). The WiFi Fusion firmware may interface with a hardware abstraction layer (HAL) 1716. A high-level operating system (HLOS) 1720 may provide an embedded OS to provide higher level services such as multimedia playback, Graphical User Interface (GUI) frameworks including built-in touch screen support and other features required for mobile device applications. The framework 1700 is an example and not a limitation as other hardware, drivers and firmware may be used. For example, additional firmware modules may include database applications, multi-modal RF fusion, geofencing and history/batching modules. A wireless node may include one or more secure processors, Trusted Execution Environments, and the framework 1700 may utilize corresponding trusted applications and trust zones for secure processing and exchange of barrier type information. For example, a secure processor may be an ARM Cortex based processor and may include an ARM TrustZone to enable embedded security options. In an example, a wireless node may also include hypervisors running on processors that support multiple trusted virtual machines that conduct sensing operations protected from malware that could run on high level operating systems.

Figure 18:
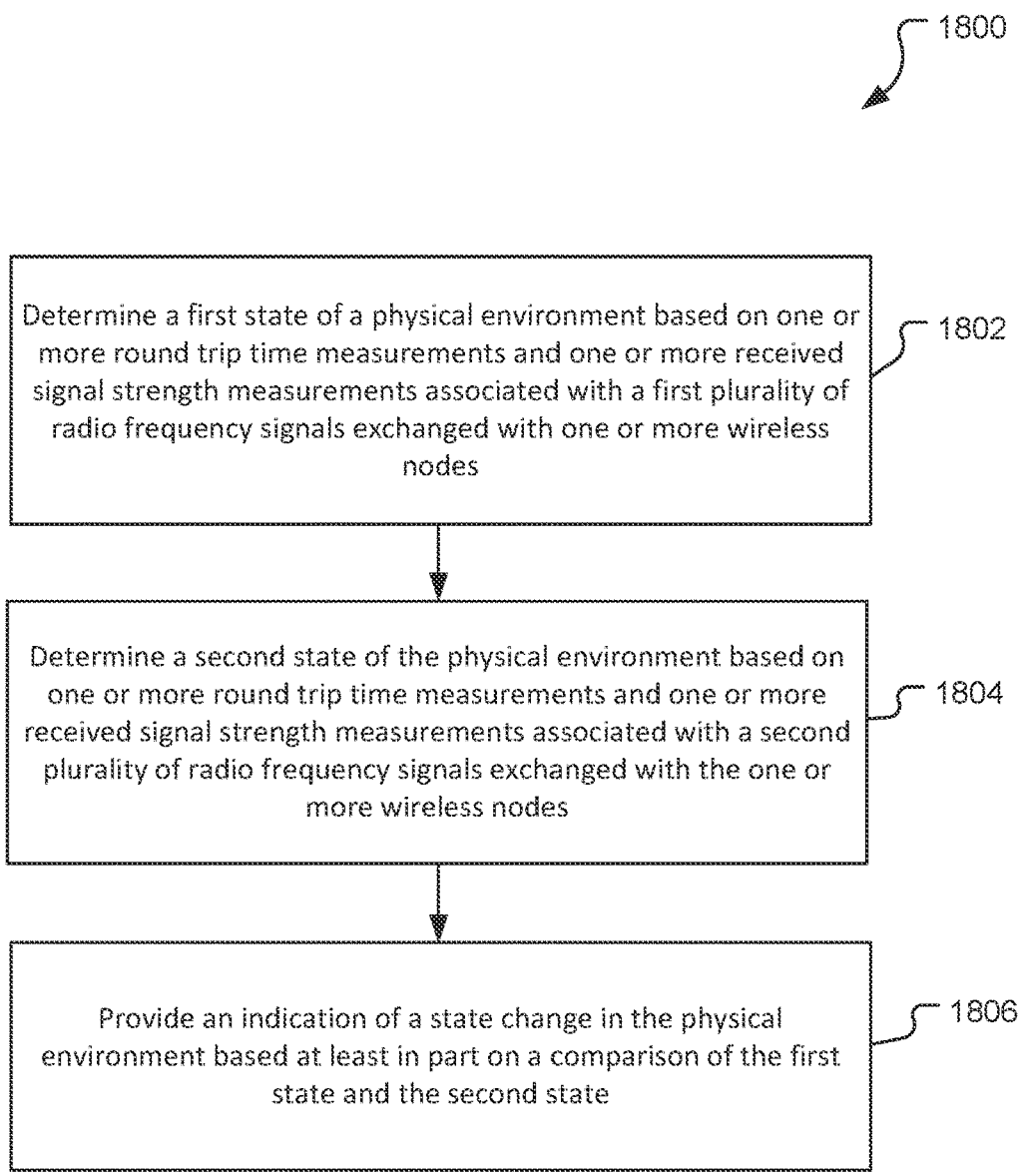
FIG. 18 is a process flow for an example method of detecting a change of state for a physical environment.

Referring to FIG. 18, with further reference to FIGS. 1-17, a method 1800 for detecting a change in state for a physical environment includes the stages shown. The method 1800 is, however, an example and not limiting. The method 1800 may be altered, e.g., by having stages added, removed, rearranged, combined, performed concurrently, and/or having single stages split into multiple stages.

At stage 1802, the method includes determining a first state of a physical environment based on one or more round trip time measurements and one or more received signal strength measurements associated with a first plurality of radio frequency signals exchanged with one or more wireless nodes. A wireless node such as the UE 200, including one or more processors 210 and a transceiver 215 is a means for determining a first state of a physical environment. In an example, referring to FIG. 15A, wireless nodes such as the UE 1514, the AP 1504, the vehicle 1512 and the outdoor camera 1510 may be configured to communicate wirelessly via RF signals (e.g., WiFi, BT, UWB, etc.) and obtain RTT and RSSI measurement values at a first time to determine a first state of a physical environment (e.g., the home 1502). The RTT and RSSI measurement values may be used to detect barriers such as windows and doors between the wireless nodes. In a first state, the windows and door may be closed. Other use cases may have other possible states. For example, a dry basement, full shelves, empty parking lots, etc. may define states for their respective physical environments.

At stage 1804, the method includes determining a second state of the physical environment based on one or more round trip time measurements and one or more received signal strength measurements associated with a second plurality of radio frequency signals exchanged with the one or more wireless nodes. The wireless node including one or more processors 210 and a transceiver 215 is a means for determining a second state of a physical environment. The wireless nodes may be configured to obtain additional RTT and RSSI measurement values at a second time to determine the second state of the physical environment. For example, the RTT and RSSI measurement values may detect a change in barrier type such as when a window or door is opened (e.g., not attenuating the RF signals). Other state changes such as when water floods a basement, when shelves are full, partially full, empty, or when vehicles are parked in a lot, and other changes to the physical environment which will cause a change in the RF signal attenuation as compared to the attenuation caused when the physical environment is in the first state. In an example, the RTT and RSSI measurement values may be used to determine a barrier type associated with a barrier based on the distance between the wireless nodes and the signal loss. In an example, barrier type information may be stored in a data structure in local memory and/or networked memory locations.

At stage 1806, the method includes providing an indication of a state change in the physical environment based at least in part on a comparison of the first state and the second state. The wireless node including one or more processors 210 and a transceiver 215 is a means for providing an indication of the change in state. In an example, the UE 1514 and/or the AP 1504 may be configured to detect a change in the RSSI measurements for RF signals exchanged with other wireless nodes when the relative positions remain constant for the first and second plurality of RF signal exchanges. AoA measurements and other location information (in addition to the RTT measurements) may also be used to detect state changes in the physical environment. The indication of the state change may include, for example, a visual, audible, or haptic (e.g., vibration) response configured to alert a user of the state change (e.g., a notification on the display). Other indications may include providing alerts/messages to other controllers such as the environmental controller 1506, the sound system controller 1508, and/or other controllers configured to utilize state information.

Figure 19:
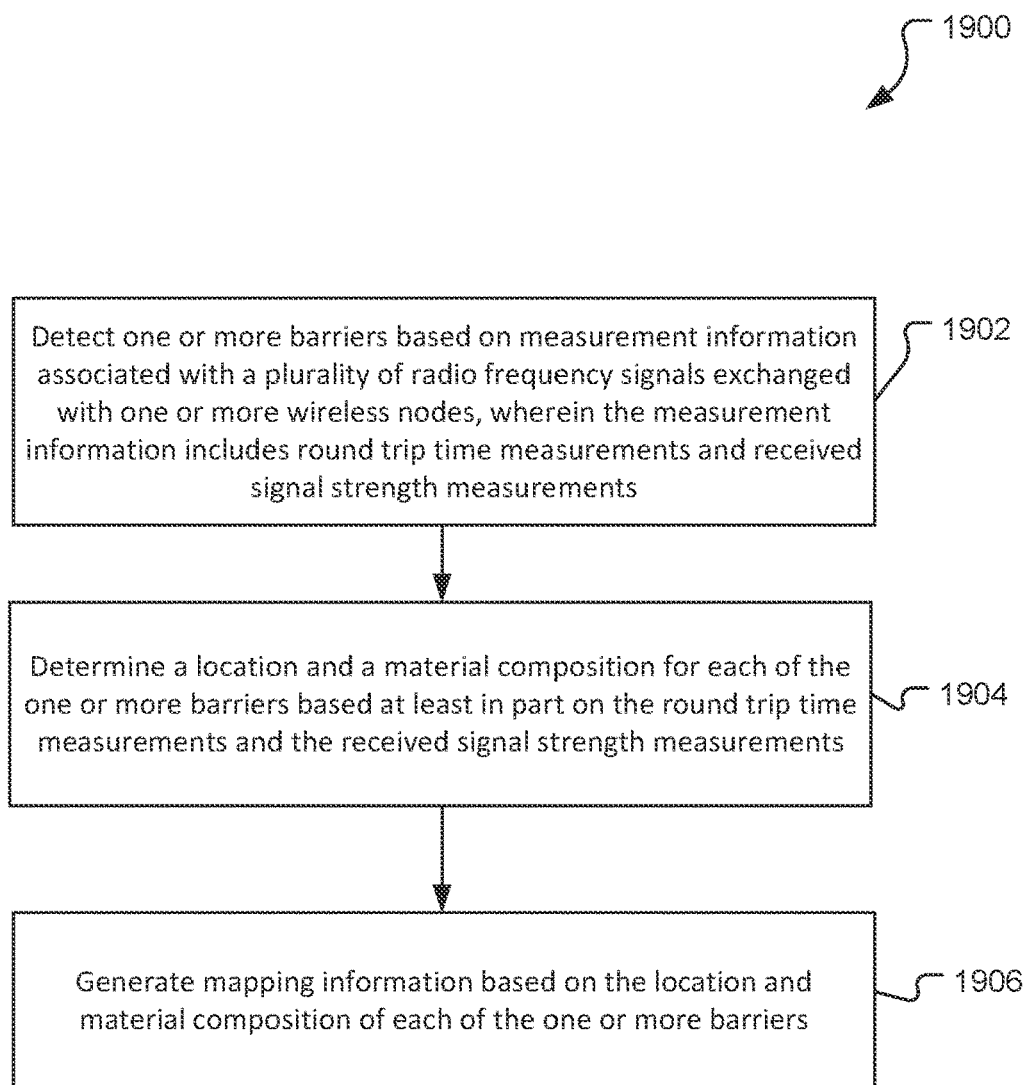
FIG. 19 is a process flow for an example method of generating mapping information based on barrier detection.

Referring to FIG. 19, with further reference to FIGS. 1-17, a method 1900 for generating mapping information based on barrier detection includes the stages shown. The method 1900 is, however, an example and not limiting. The method 1900 may be altered, e.g., by having stages added, removed, rearranged, combined, performed concurrently, and/or having single stages split into multiple stages.

At stage 1902, the method includes detecting one or more barriers based on measurement information associated with a plurality of radio frequency signals exchanged with one or more wireless nodes, wherein the measurement information includes round trip time measurements and received signal strength measurements. A wireless node such as the UE 200, including one or more processors 210 and a transceiver 215 is a means for detecting one or more barriers. In an example, referring to FIG. 11, a UE or AP may be configured to obtain RTT and RSSI information from a wireless nodes at various locations in the indoor area 1120. In an example, AoA and/or RF sensing information may also be obtained by the UEs and APs. The UEs and/or APs may be configured to store the RTT, RSSI, AoA and RF sensing measurement information to determine location and barrier type information. In an example, a location server 1110 may be configured to receive and analyze the measurement information.

At stage 1904, the method includes determining a location and a material composition for each of the one or more barriers based at least in part on the round trip time measurements and the received signal strength measurements. The wireless node including one or more processors 210 and a transceiver 215 is a means for determining the location and the material composition for each of the one or more barriers. In an example, referring to FIG. 9, the difference between range information associated with the RTT measurements and the RSSI measurements may be used to determine material composition information. The location of the barrier may be estimated based on AoA measurements and/or RF sensing measurements. In an example, other positioning techniques such as multilateration with other wireless nodes (e.g., anchor nodes) may be used to establish the locations of the wireless nodes and the estimated locations of the one or more barriers (e.g., being located between the wireless nodes). In an example, the location server 1110 may be configured to analyze the RTT. RSSI. AoA. RF sensing, and/or other location information to determine the location and material composition of the one or more barriers.

At stage 1906, the method includes generating mapping information based on the location and material composition of each of the one or more barriers. The wireless node including one or more processors 210 is a means for generating the mapping information. In an example, the mapping information may include the estimated locations of walls and doors, such as the doors 1108*a-c*. For example, the wireless node and/or the location server 1110 may be configured to apply the barrier detection techniques described herein to the collected RTT, RSSI, AoA, and RF sensing measurements to determine the composition of the wooden door 1108*a*, the metal door 1108*b*, and the glass door 1108*c*. The generated mapping information may be applied to different use cases such as contact tracing, indoor navigation for robots, assisted navigation for people with disabilities, or routing information for an emergency egress. Other mapping applications may utilize the location and material composition information.

Figure 20:
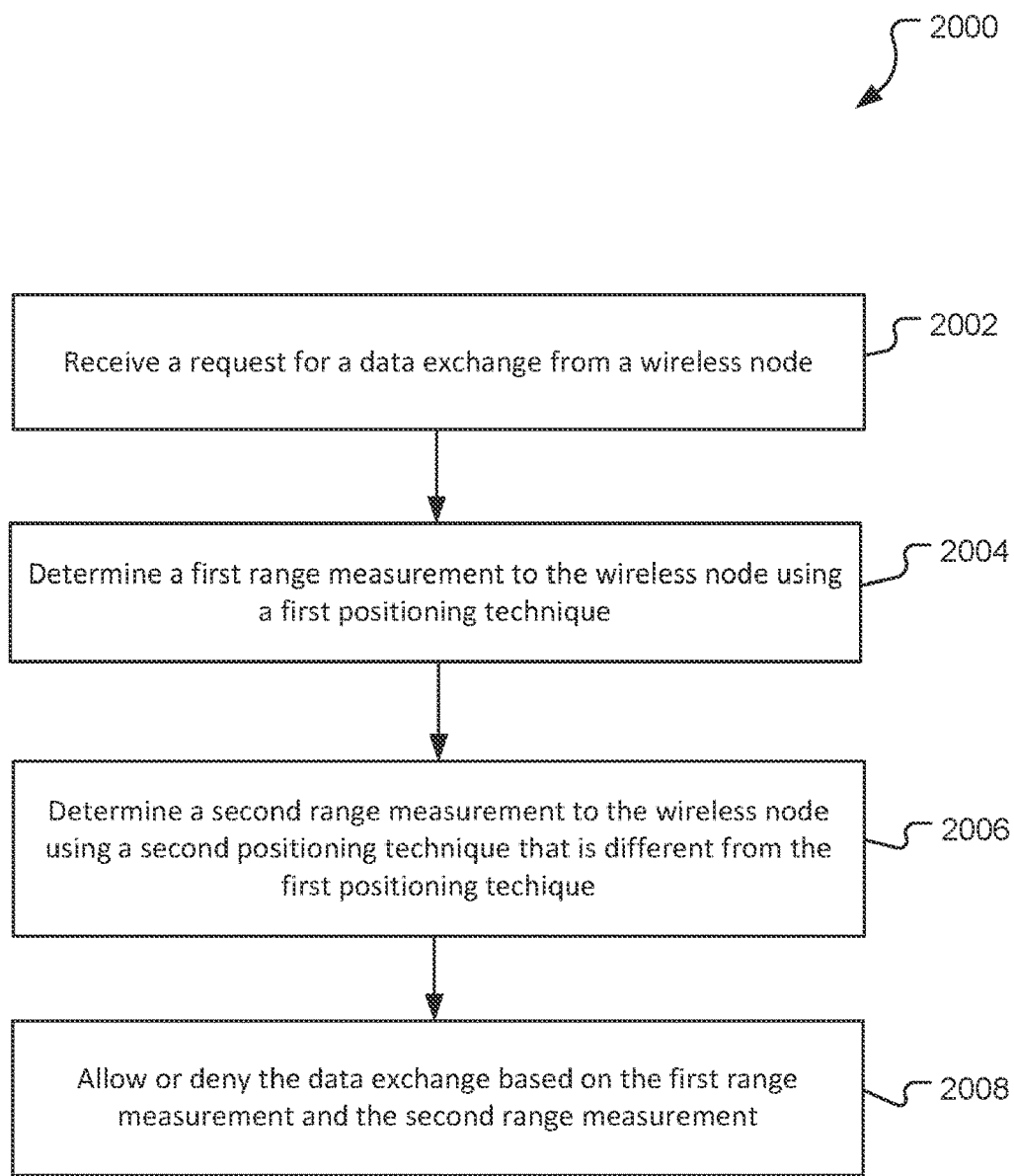
FIG. 20 is a process flow for an example method of authorizing a device-to-device data exchange based on barrier detection information.

Referring to FIG. 20, with further reference to FIGS. 1-17, a method 2000 for authorizing a device-to-device data exchange based on barrier detection information includes the stages shown. The method 2000 is, however, an example and not limiting. The method 2000 may be altered, e.g., by having stages added, removed, rearranged, combined, performed concurrently, and/or having single stages split into multiple stages.

At stage 2002, the method includes receiving a request for a data exchange from a wireless node. A UE 200, including one or more processors 210 and a transceiver 215 is a means for receiving a request for a data exchange. In an example, referring to FIGS. 14A and 14B, the UE 1402 may receive a request to perform a data exchange (e.g., file transfer, payment information, etc.) via a wireless link from a proximate wireless node such as the second UE 1404 or the third UE 1424. In an example, the data exchange may be an electronic key entry code for entering a vehicle such as describe in FIGS. 10A and 10B. The wireless link may utilize WiFi, BT, UWB, or other sidelinks configured for D2D data sharing.

At stage 2004, the method includes determining a first range measurement to the wireless node using a first positioning technique. The one or more processors 210 and the transceiver 215 are a means for determining the first range measurement. The first range measurement may be based on RTT techniques such as described in FIG. 5. For example, the RTT measurements may utilize the wireless link established with the wireless node. The range to the wireless node may be based on the RTT value determined via equation (1). That is, the range to the first node is equal to the RTT/2 times the speed of light. In an example, the AoA of RTT messages may also be determined.

At stage 2006, the method includes determining a second range measurement to the wireless node using a second positioning technique that is different from the first positioning technique. The one or more processors 210 and the transceiver 215 are a means for determining the second range measurement. The second measurement may utilize the RSSI of the signals exchanged with the wireless node. In an example, the RSSI value may be the expected propagation of the signals (e.g., equation (2)) based on the distance to the wireless node (e.g., the first range measurement obtained at stage 2004), which indicates the wireless node is not behind a barrier. In an example, the RSSI value may be less than the expected propagation due to attenuation caused by a barrier.

At stage 2008, the method includes allowing or denying the data exchange based on the first range measurement and the second range measurement. The one or more processors 210 and the transceiver 215 are a means for allowing or denying the data exchange. The data exchange may be denied if the measured RSSI value is less than the expected RSSI value (e.g., based on the distance determined with the RTT measurements). For example, referring to FIG. 14B, the discrepancy in the first and second range measurements may indicate the presence of the barrier 1422. The RSSI value may be compared to a threshold value to determine whether the barrier is significant (e.g., a wall, door, etc.) or minor (e.g., a backpack, notebook, etc.). In an example, the threshold value may be based on a current context of a UE. For example, a trusted environment (e.g., a user's home, office) may have a different threshold value than a public area (e.g., park, campus). The data exchange may be allowed if the measured RSSI value meets and expected value (e.g., based on the expected propagation losses) or if it meets an established threshold value (e.g., RSSI losses associated with minor barriers).

Figure 21:
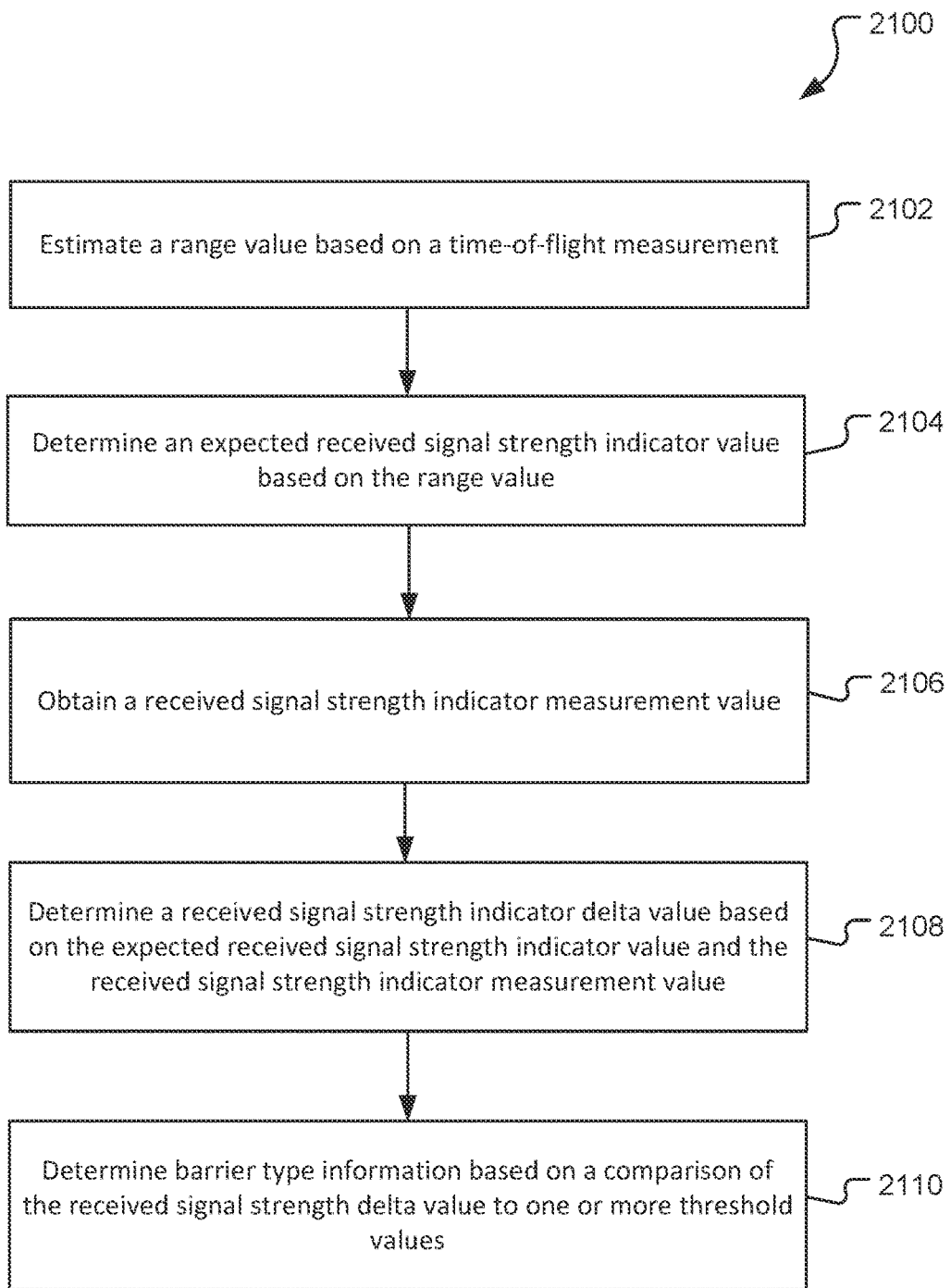
FIG. 21 is a process flow for an example method for determining barrier type information.

Referring to FIG. 21, with further reference to FIGS. 1-17, a method 2100 for determining barrier type information includes the stages shown. The method 2100 is, however, an example and not limiting. The method 2100 may be altered, e.g., by having stages added, removed, rearranged, combined, performed concurrently, and/or having single stages split into multiple stages.

At stage 2102, the method includes estimating a range value based on a time-of-flight measurement. A wireless node such as the UE 200, including one or more processors 210 and a transceiver 215 is a means for estimating a range value based on a time-of-flight measurement. Two wireless nodes, such as UEs, APs, IoT devices, etc., may be configured to exchange RTT messages to estimate the range value. For example, the wireless nodes may be configured to utilize the FTM Protocol (e.g., 802.11mc D4.3 section 10.24.6) to exchange round trip measurement frames (e.g., FTM frames). Other ToF measurement techniques may also be used to estimate the range.

At stage 2104, the method includes determining an expected receive signal strength indicator value based on the range value. The UE 200, including one or more processors 210 and a transceiver 215, is a means for determining the expected RSSI value. The UE 200 may be configured to determine the expected RSSI value based on known propagation equations, such as equation (2).

At stage 2106, the method includes obtaining a received signal strength indicator measurement value. The UE 200, including one or more processors 210 and a transceiver 215, is a means for obtaining the RSSI measurement value. The RSSI value may be based on the RTT message exchange, or other signals transmitted between wireless nodes.

At stage 2108, the method includes determining a received signal strength indicator delta value based on the expected received signal strength indicator value and the received signal strength indicator measurement value. The UE 200, including one or more processors 210 and a transceiver 215, is a means for determining the RSSI delta value. The RSSI delta value may be difference between the expected RSSI value determined at stage 2104 and the RSSI measurement value obtained at stage 2106.

At stage 2110, the method includes determining barrier type information based on a comparison of the received signal strength delta value to one or more threshold values. The UE 200, including one or more processors 210 and a memory 211, is a means for determining the barrier type information. In an example, referring to FIG. 9, one or more threshold values may be associated with different barrier types. The threshold values may be stored in a data structure (e.g., LUT) in a local or networked memory and the UE 200 may be configured to compare the RSSI delta value with the threshold values in the data structure to determine the barrier type information.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C." or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for generating mapping information, comprising: detecting one or more barriers based on measurement information associated with a plurality of radio frequency signals exchanged with one or more wireless nodes, wherein the measurement information includes round trip time measurements and received signal strength measurements; determining a location and a material composition for each of the one or more barriers based at least in part on the round trip time measurements and received signal strength measurements; and generating mapping information based on the location and the material composition of each of the one or more barriers.

Clause 2. The method of clause 1 wherein detecting the one or more barriers is further based on radio frequency sensing information obtained by the one or more wireless nodes.

Clause 3. The method of clause 1 further comprising determining angle of arrival information associated with the plurality of radio frequency signals exchanged with the one or more wireless nodes, wherein determining the location of each of the one or more barriers is based at least in part on the angle of arrival information.

Clause 4. The method of clause 1 wherein determining the material composition for each of the one or more barriers includes obtaining material composition information from a data structure based on the round trip time information and received signal strength information.

Clause 5. The method of clause 4 wherein the data structure is maintained on a networked server.

Clause 6. The method of clause 1 wherein the one or more barriers includes a door or a window.

Clause 7. The method of clause 6 further comprising determining a current state of the door or the window.

Clause 8. The method of clause 1 wherein the one or more wireless nodes includes a user equipment.

Clause 9. A method performed by a user equipment for authorizing a device-to-device request, comprising: receiving a request from a wireless node; determining a first range measurement to the wireless node using a first positioning technique; determining a second range measurement to the wireless node using a second positioning technique that is different from the first positioning technique; and allowing or denying the request based on the first range measurement and the second range measurement.

Clause 10. The method of clause 9 wherein the first positioning technique is based on a time-of-flight measurement of radio signals exchanged with the wireless node.

Clause 11. The method of clause 9 wherein the first positioning technique is based on a received signal strength indication of radio signals received from the wireless node.

Clause 12. The method of clause 9 wherein the request is for a file transfer between a first user equipment and a second user equipment.

Clause 13. The method of clause 9 wherein the request is for enabling access to a vehicle.

Clause 14. The method of clause 9 further comprising determining a barrier type based on the first range measurement and the second range measurement, and allowing or denying the request based at least in part on the barrier type.

Clause 15. The method of clause 9 wherein at least one of the first positioning technique or the second positioning technique includes obtaining angle of arrival information, and allowing or denying the request is based at least in part on the angle of arrival information.

Clause 16. The method of clause 9 wherein the request is for providing financial payment information.

Clause 17. An apparatus, comprising: a memory; at least one transceiver; at least one processor communicatively coupled to the memory and the at least one transceiver, and configured to: detect one or more barriers based on measurement information associated with a plurality of radio frequency signals exchanged with one or more wireless nodes, wherein the measurement information includes round trip time measurements and received signal strength measurements; determine a location and a material composition for each of the one or more barriers based at least in part on the round trip time measurements and received signal strength measurements; and generate mapping information based on the location and the material composition of each of the one or more barriers.

Clause 18. The apparatus of clause 17 wherein the at least one processor is further configured to detect the one or more barriers based on radio frequency sensing information obtained by the one or more wireless nodes.

Clause 19. The apparatus of clause 17 wherein the at least one processor is further configured to determine angle of arrival information associated with the plurality of radio frequency signals exchanged with the one or more wireless nodes, and determine the location of each of the one or more barriers based at least in part on the angle of arrival information.

Clause 20. The apparatus of clause 17 wherein the at least one processor is further configured to obtain material composition information from a data structure based on the round trip time information and received signal strength information.

Clause 21. The apparatus of clause 20 wherein the data structure is maintained on a networked server.

Clause 22. The apparatus of clause 17 wherein the one or more barriers includes a door or a window.

Clause 23. The apparatus of clause 22 wherein the at least one processor is further configured to determine a current state of the door or the window.

Clause 24. The apparatus of clause 17 wherein the one or more wireless nodes includes a user equipment.

Clause 25. An apparatus, comprising: a memory; at least one transceiver; at least one processor communicatively coupled to the memory and the at least one processor and configured to: receive a request from a wireless node; determine a first range measurement to the wireless node using a first positioning technique; determine a second range measurement to the wireless node using a second positioning technique that is different from the first positioning technique; and allow or deny the request based on the first range measurement and the second range measurement.

Clause 26. The apparatus of clause 25 wherein the at least one processor is further configured to determine the first range measurement based on a time-of-flight measurement of radio signals exchanged with the wireless node.

Clause 27. The apparatus of clause 25 wherein the at least one processor is further configured to determine the first range measurement based on a received signal strength indication of radio signals received from the wireless node.

Clause 28. The apparatus of clause 25 wherein the request is for a file transfer between a first user equipment and a second user equipment.

Clause 29. The apparatus of clause 25 wherein the request is for enabling access to a vehicle.

Clause 30. The apparatus of clause 25 wherein the at least one processor is further configured to determine a barrier type based on the first range measurement and the second range measurement, and to allow or deny the request based at least in part on the barrier type.

Clause 31. The apparatus of clause 25 wherein the at least one processor is further configured to obtain angle of arrival information, and to allow or deny the request based at least in part on the angle of arrival information.

Clause 32. The apparatus of clause 25 wherein the request includes providing financial payment information.

Clause 33. An apparatus for generating mapping information, comprising: means for detecting one or more barriers based on measurement information associated with a plurality of radio frequency signals exchanged with one or more wireless nodes, wherein the measurement information includes round trip time measurements and received signal strength measurements; means for determining a location and a material composition for each of the one or more barriers based at least in part on the round trip time measurements and received signal strength measurements; and means for generating mapping information based on the location and the material composition of each of the one or more barriers.

Clause 34. An apparatus for authorizing a device-to-device request, comprising: means for receiving a request from a wireless node; means for determining a first range measurement to the wireless node using a first positioning technique; means for determining a second range measurement to the wireless node using a second positioning technique that is different from the first positioning technique; and means for allowing or denying the request based on the first range measurement and the second range measurement.

Clause 35. A non-transitory processor-readable storage medium comprising processor-readable instructions configured to cause one or more processors to generate mapping information, comprising code for: detecting one or more barriers based on measurement information associated with a plurality of radio frequency signals exchanged with one or more wireless nodes, wherein the measurement information includes round trip time measurements and received signal strength measurements; determining a location and a material composition for each of the one or more barriers based at least in part on the round trip time measurements and received signal strength measurements; and generating the mapping information based on the location and the material composition of each of the one or more barriers.

Clause 36. A non-transitory processor-readable storage medium comprising processor-readable instructions configured to cause one or more processors to authorize a device-to-device request, comprising code for: receiving a request from a wireless node; determining a first range measurement to the wireless node using a first positioning technique; determining a second range measurement to the wireless node using a second positioning technique that is different from the first positioning technique; and allowing or denying the request based on the first range measurement and the second range measurement.

The invention claimed is:

1. A method for generating mapping information, comprising:
    detecting one or more barriers based on measurement information associated with a plurality of radio frequency signals exchanged with one or more wireless nodes, wherein the measurement information include round trip time measurements and received signal strength measurements;
    determining a location and a material composition for each of the one or more barriers based at least in part on the round trip time measurements and the received signal strength measurements; and
    generating mapping information based on the location and the material composition of each of the one or more barriers.

2. The method of claim 1 wherein detecting the one or more barriers is further based on radio frequency sensing information obtained by the one or more wireless nodes.

3. The method of claim 1 further comprising determining angle of arrival information associated with the plurality of radio frequency signals exchanged with the one or more wireless nodes, wherein determining the location of each of the one or more barriers is based at least in part on the angle of arrival information.

4. The method of claim 1 wherein determining the material composition for each of the one or more barriers includes obtaining material composition information from a data structure based on the round trip time measurements and the received signal strength measurements.

5. The method of claim 4 wherein the data structure is maintained on a networked server.

6. The method of claim 1 wherein the one or more barriers includes a door or a window.

7. The method of claim 6 further comprising determining a current state of the door or the window.

8. The method of claim 1 wherein the one or more wireless nodes includes a user equipment.

9. A method performed by a user equipment for authorizing a device-to-device request, comprising:
    receiving a request from a wireless node;
    determining a first range measurement to the wireless node using a first positioning technique;
    determining a second range measurement to the wireless node using a second positioning technique that is different from the first positioning technique; and
    allowing or denying the request based on the first range measurement and the second range measurement.

10. The method of claim 9 wherein the first positioning technique is based on a time-of-flight measurement of radio signals exchanged with the wireless node.

11. The method of claim 9 wherein the first positioning technique is based on a received signal strength indication of radio signals received from the wireless node.

12. The method of claim 9 wherein the request is for a file transfer between the user equipment and the wireless node.

13. The method of claim 9 wherein the request is for enabling access to a vehicle.

14. The method of claim 9 further comprising determining a barrier type based on the first range measurement and the second range measurement, and allowing or denying the request is based at least in part on the barrier type.

15. The method of claim 9 wherein at least one of the first positioning technique or the second positioning technique includes obtaining angle of arrival information, and allowing or denying the request is based at least in part on the angle of arrival information.

16. The method of claim 9 wherein the request is for providing financial payment information.

17. An apparatus, comprising:
    a memory;
    at least one transceiver;
    at least one processor communicatively coupled to the memory and the at least one transceiver, and configured to:
        detect one or more barriers based on measurement information associated with a plurality of radio frequency signals exchanged with one or more wireless nodes, wherein the plurality of radio frequency signals include round trip time measurements and received signal strength measurements;
        determine a location and a material composition for each of the one or more barriers based at least in part on the round trip time measurements and the received signal strength measurements; and
        generate mapping information based on the location and the material composition of each of the one or more barriers.

18. The apparatus of claim 17 wherein the at least one processor is further configured to detect the one or more barriers based at least in part on radio frequency sensing information obtained by the one or more wireless nodes.

19. The apparatus of claim 17 wherein the at least one processor is further configured to determine angle of arrival information associated with the plurality of radio frequency signals exchanged with the one or more wireless nodes, and determine the location of each of the one or more barriers based at least in part on the angle of arrival information.

20. The apparatus of claim 17 wherein the at least one processor is further configured to obtain material composition information from a data structure based on the round trip time measurements and the received signal strength measurements.

21. The apparatus of claim 20 wherein the data structure is maintained on a networked server.

22. The apparatus of claim 17 wherein the one or more barriers includes a door or a window.

23. The apparatus of claim 22 wherein the at least one processor is further configured to determine a current state of the door or the window.

24. The apparatus of claim 17 wherein the one or more wireless nodes includes a user equipment.

25. An apparatus, comprising:
    a memory;
    at least one transceiver;
    at least one processor communicatively coupled to the memory and the at least one processor and configured to:
        receive a request from a wireless node;
        determine a first range measurement to the wireless node using a first positioning technique;
        determine a second range measurement to the wireless node using a second positioning technique that is different from the first positioning technique; and
        allow or deny the request based on the first range measurement and the second range measurement.

26. The apparatus of claim 25 wherein the at least one processor is further configured to determine the first range measurement based on a time-of-flight measurement of radio signals exchanged with the wireless node.

27. The apparatus of claim 25 wherein the at least one processor is further configured to determine the first range measurement based on a received signal strength indication of radio signals received from the wireless node.

28. The apparatus of claim 25 wherein the wireless node is a user equipment.

29. The apparatus of claim 25 wherein the request is for enabling access to a vehicle.

30. The apparatus of claim 25 wherein the at least one processor is further configured to determine a barrier type based on the first range measurement and the second range measurement, and to allow or deny the request based at least in part on the barrier type.

\* \* \* \* \*